(12) United States Patent
Mattam et al.

(10) Patent No.: US 11,425,772 B2
(45) Date of Patent: Aug. 23, 2022

(54) METHOD AND SYSTEM FOR INDICATION OF A CHANGE IN MULTI-RADIO ACCESS TECHNOLOGY DUAL CONNECTIVITY CAPABILITY

(71) Applicant: Samsung Electronics Co., Ltd., Suwon-si (KR)

(72) Inventors: Jajohn Mathew Mattam, Bangalore (IN); Fasil Abdul Latheef, Bangalore (IN); Manasi Ekkundi, Bangalore (IN); Vijay Saha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/044,823

(22) PCT Filed: Aug. 2, 2019

(86) PCT No.: PCT/KR2019/009652
§ 371 (c)(1),
(2) Date: Oct. 1, 2020

(87) PCT Pub. No.: WO2020/027616
PCT Pub. Date: Feb. 6, 2020

(65) Prior Publication Data
US 2021/0185753 A1    Jun. 17, 2021

(30) Foreign Application Priority Data

Aug. 2, 2018    (IN) .............................. 201841029151
Jun. 11, 2019    (IN) .............................. 201841029151

(51) Int. Cl.
*H04W 76/16*    (2018.01)
*H04W 76/30*    (2018.01)
(Continued)

(52) U.S. Cl.
CPC ............. *H04W 76/16* (2018.02); *H04W 4/14* (2013.01); *H04W 8/24* (2013.01); *H04W 60/04* (2013.01); *H04W 76/30* (2018.02)

(58) Field of Classification Search
CPC .............................. H04W 76/27; Y02D 30/70
(Continued)

(56) References Cited

U.S. PATENT DOCUMENTS

2014/0056200 A1    2/2014  Koc et al.
2014/0362824 A1    12/2014 Rousu et al.
(Continued)

FOREIGN PATENT DOCUMENTS

KR    10-2014-0127284 A    11/2014
WO    2013/091665 A1    6/2013
(Continued)

OTHER PUBLICATIONS

Intellectual Property India, "Examination report under sections 12 & 13 of the Patents Act, 1970 and the Patents Rules, 2003" dated Feb. 3, 2021, in connection with Indian Patent Application No. 201841029151, 6 pages.
(Continued)

*Primary Examiner* — Kiet M Doan

(57) ABSTRACT

Accordingly the embodiments herein provide a method for indication of change in multi-radio access technology (RAT) dual connectivity (MR-DC) capability of a user equipment (UE). The method includes detecting the change in the MR-DC capability of the UE, and identifying an operation mode of the UE, the operation mode being one of an idle mode and a connected mode. The method further comprises in response to the operation mode being the idle mode, detecting an event, checking a validity of the change in the MR-DC capability of the UE after detecting the event, and indicating the change in the MR-DC capability of the UE to
(Continued)

the first network node based on a result of the check. Further the method comprises in response to the operation mode being the connected mode, identifying that UE-assistance information is configured by the first network node, and indicating the change in the MR-DC capability of the UE to the first network node based on the UE-assistance information.

18 Claims, 21 Drawing Sheets

(51) Int. Cl.
*H04W 4/14* (2009.01)
*H04W 8/24* (2009.01)
*H04W 60/04* (2009.01)

(58) Field of Classification Search
USPC .......................................... 455/450; 370/331
See application file for complete search history.

(56) References Cited

U.S. PATENT DOCUMENTS

| | | | |
|---|---|---|---|
| 2015/0011210 A1 | 1/2015 | Drevon et al. | |
| 2017/0374578 A1* | 12/2017 | Selvaganapathy | H04W 28/08 |
| 2018/0176979 A1 | 6/2018 | Ryu et al. | |
| 2018/0263012 A1* | 9/2018 | Ryu | H04W 68/02 |
| 2019/0014612 A1* | 1/2019 | Lee | H04W 76/16 |
| 2019/0116483 A1 | 4/2019 | Ryu et al. | |

FOREIGN PATENT DOCUMENTS

| | | |
|---|---|---|
| WO | 2015/065129 A1 | 5/2015 |
| WO | 2017/164679 A1 | 9/2017 |

OTHER PUBLICATIONS

European Patent Office, "Supplementary European Search Report" dated May 7, 2021, in connection with European Patent Application No. 19843289.0, 17 pages.

Apple Inc., "UE overheating for EN-DC", 3GPP TSG-RAN WG2 Meeting #101, R2-1802414, Athens, Greece, Feb. 26-Mar. 2, 2018, 3 pages.

Catt, "UE capability temporary restrictions", 3GPP TSG-RAN WG2 #99, R2-1707891 (Resubmission of R2-1706391) Berlin, Germany, Aug. 21-25, 2017, 4 pages.

Huawei, "Report of email discussion [97#59][LTE/TEI14] UE requested configuration changes", 3GPP TSG-RAN WG2 #97bis, R2-1703475, Apr. 3-7, 2017, 14 pages.

Intel Corp, et al., "Extension of overheating indication for EN-DC," 3GPP TSG-RAN2 AH Meeting #1807, R2-1809806, Montreal, Canada, Jul. 2-6, 2018, 5 pages.

International Search Report and Written Opinion of the International Searching Authority in connection with International Application No. PCT/KR2019/009652 dated Oct. 29, 2019, 9 pages.

Apple Inc., "UE overheating for EN-DC," R2-1802415, 3GPP TSG-RAN WG2 Meeting #101, Athens, Greece, Feb. 26-Mar. 2, 2018, 10 pages.

* cited by examiner

[Fig. 1]
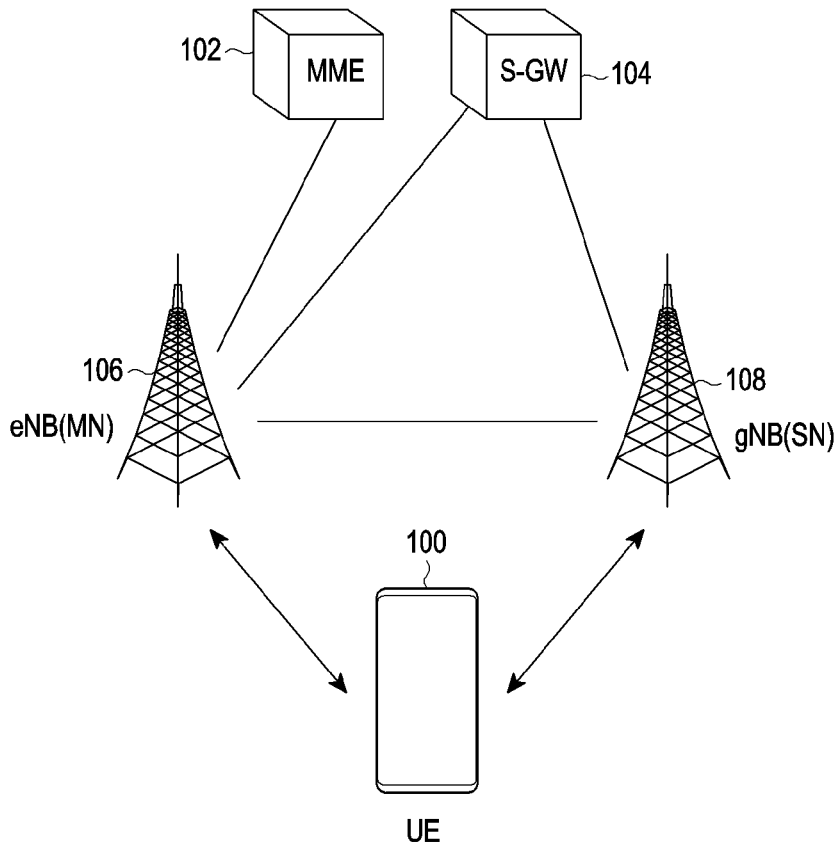
[Fig. 2]
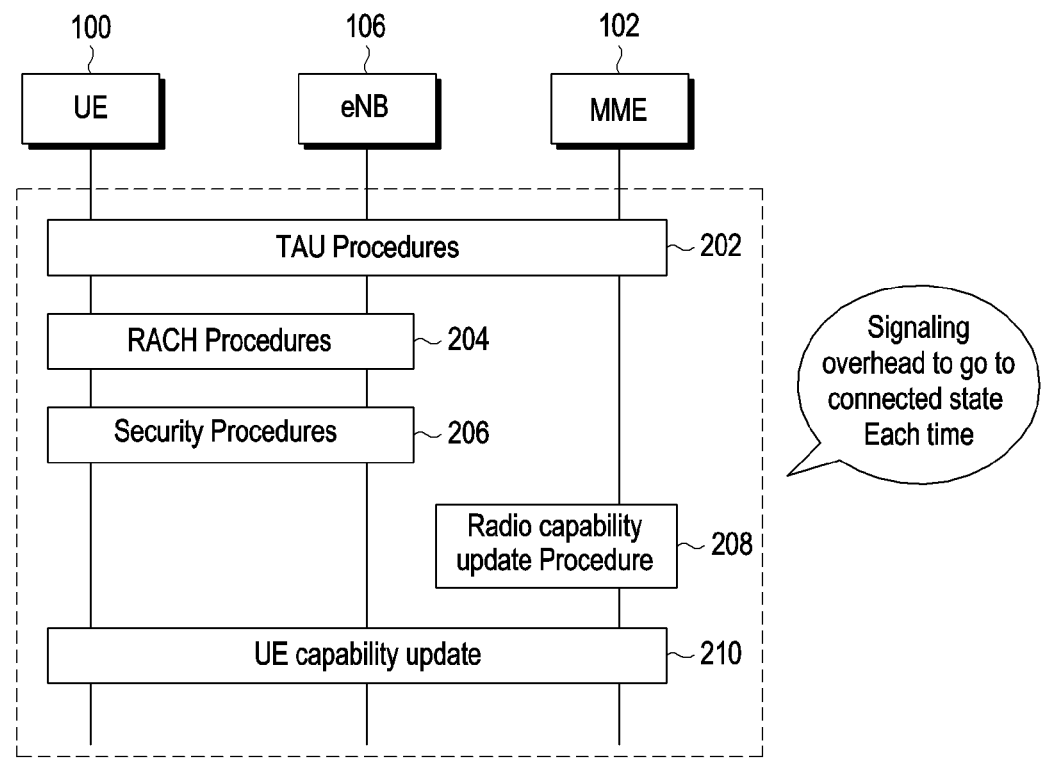

[Fig. 3]
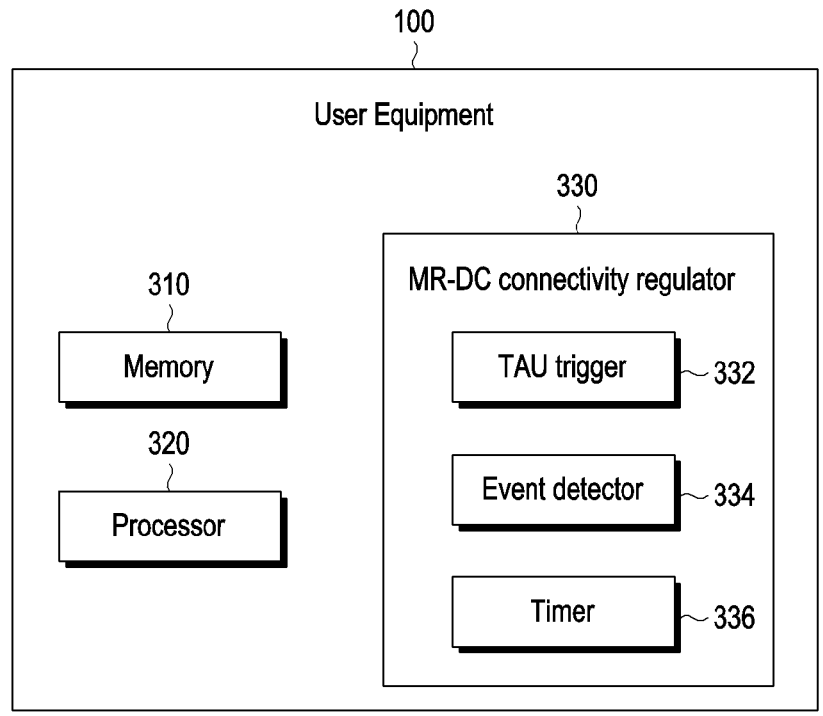
[Fig. 4]
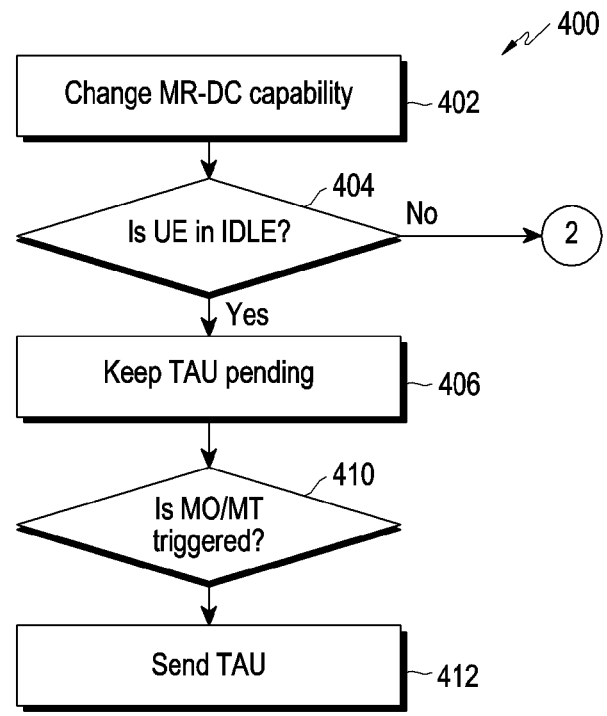

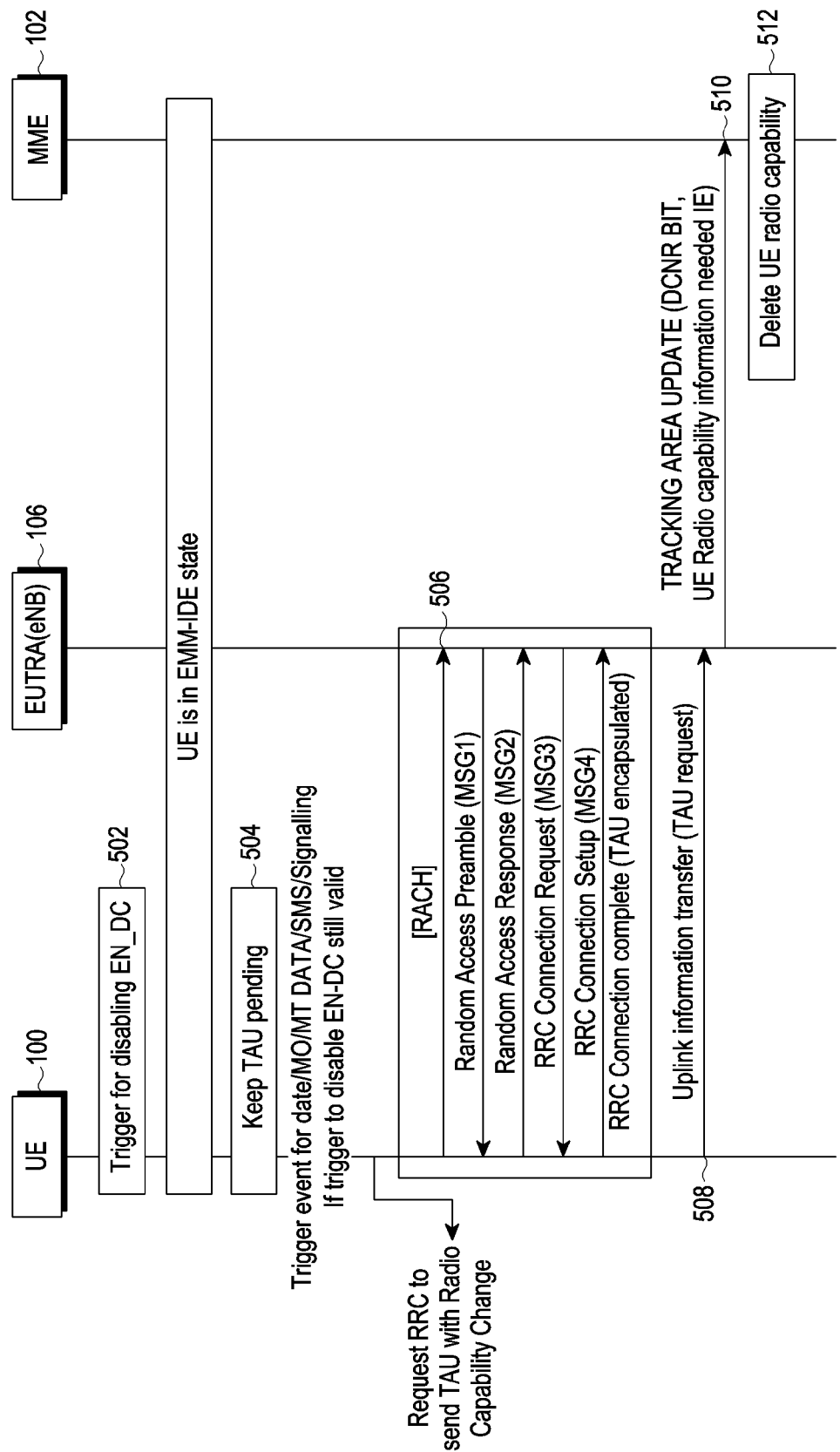

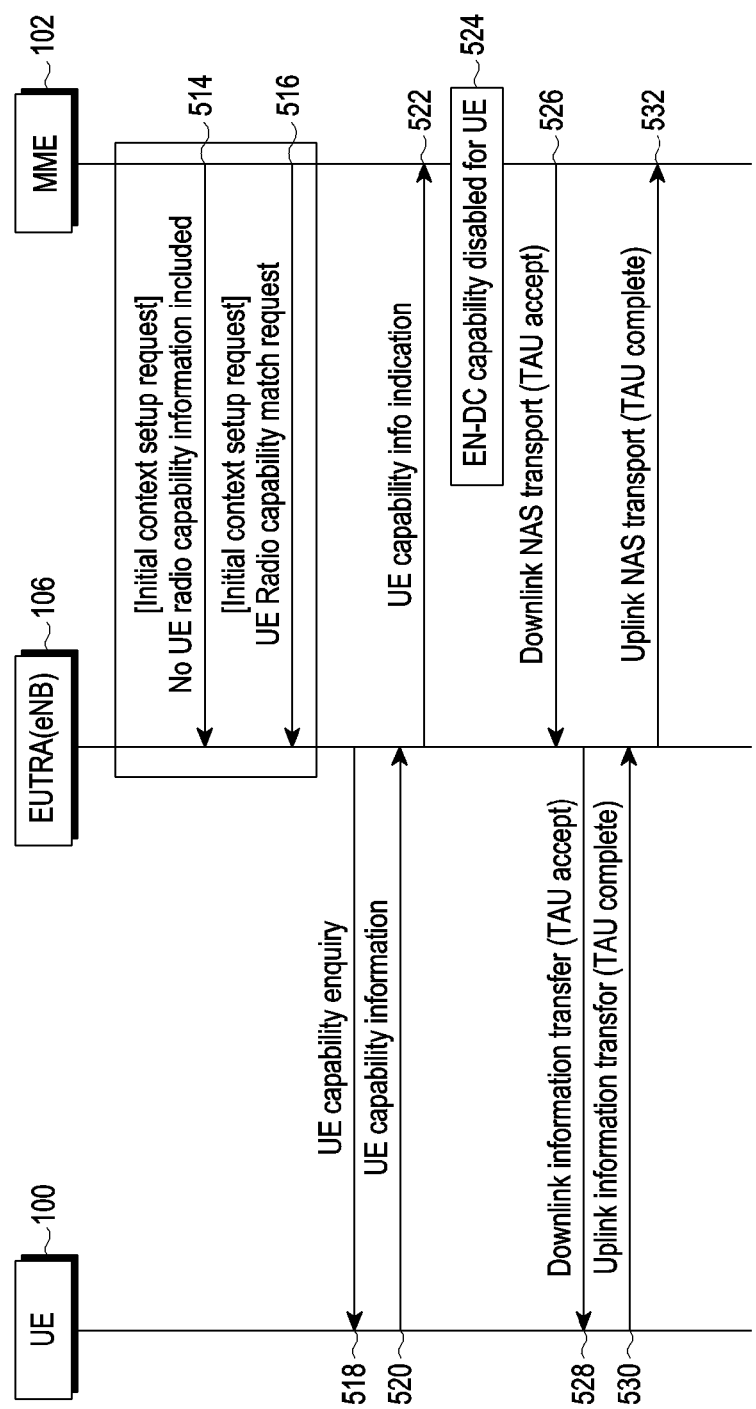
[Fig. 5b]

[Fig. 6a]
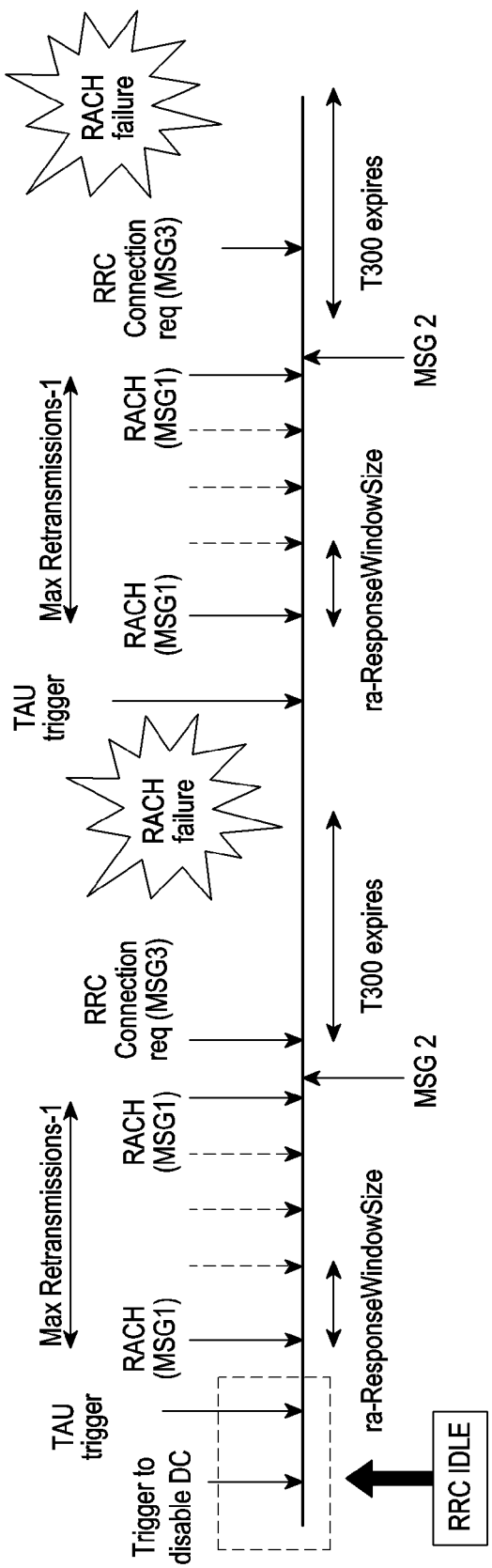

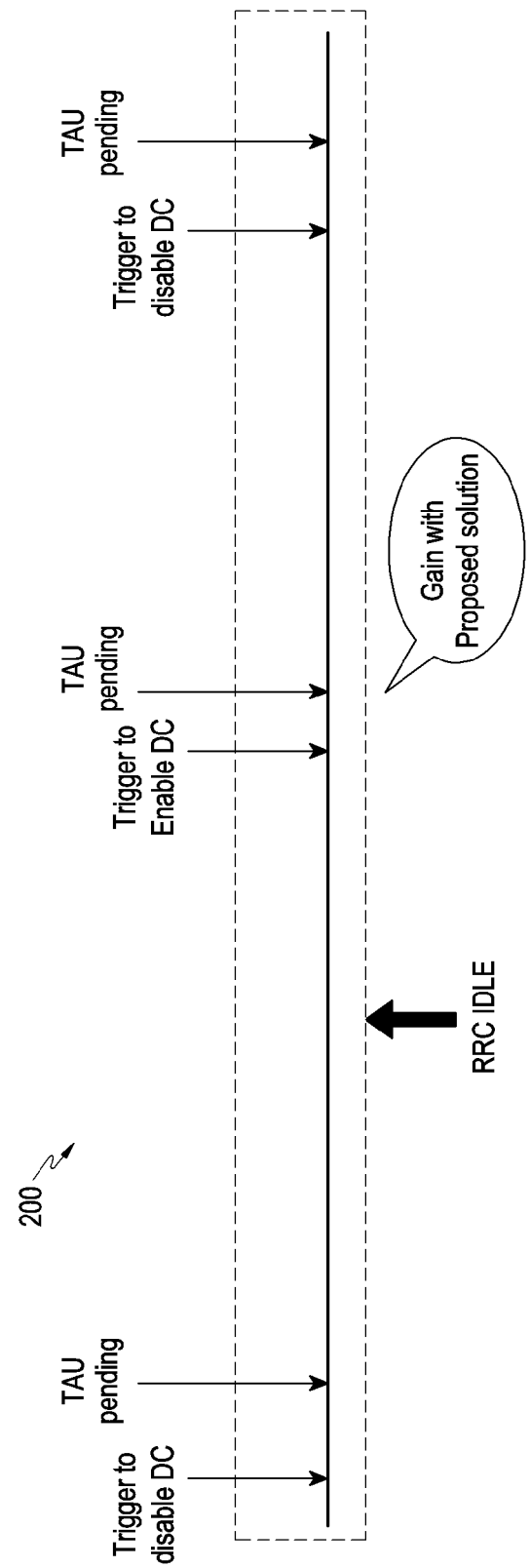
[Fig. 6b]

[Fig. 7]
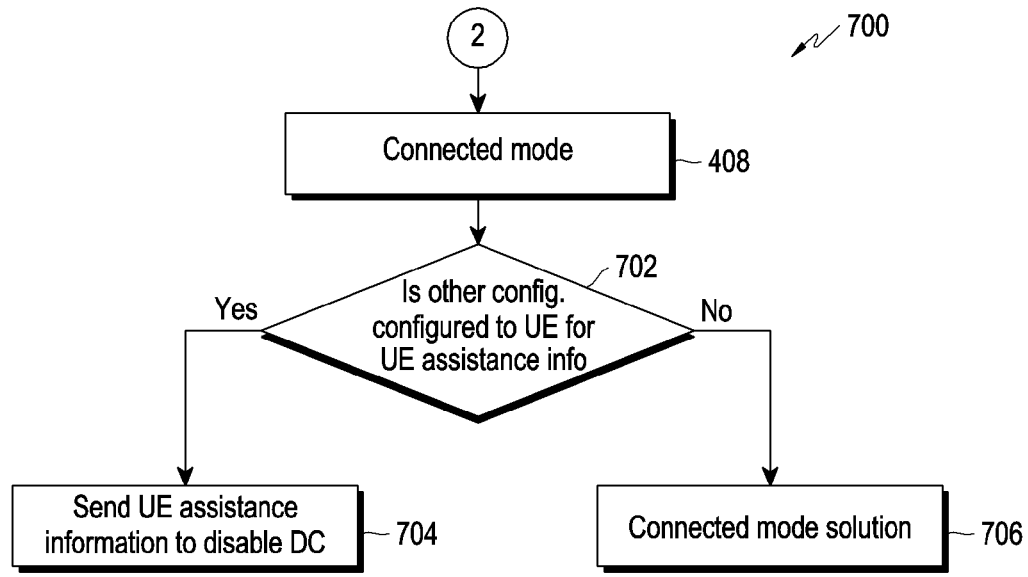
[Fig. 8]
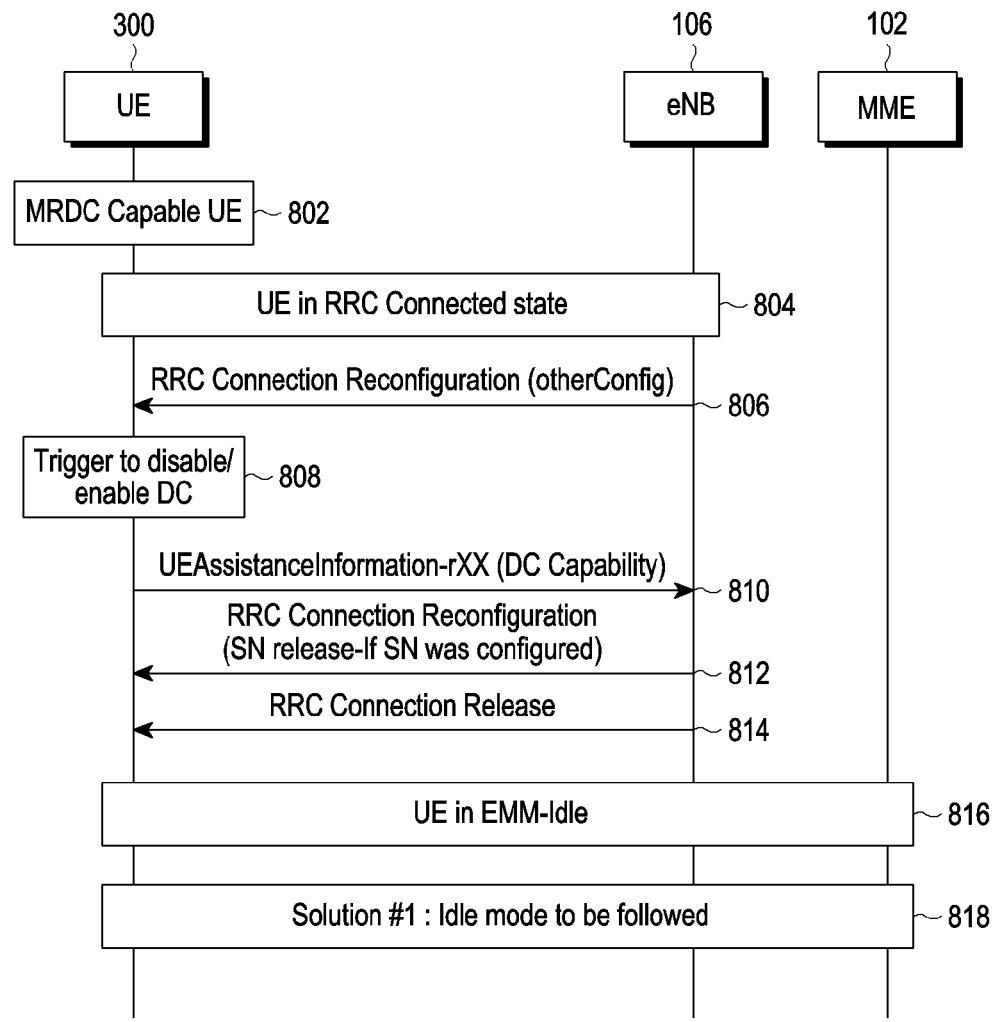

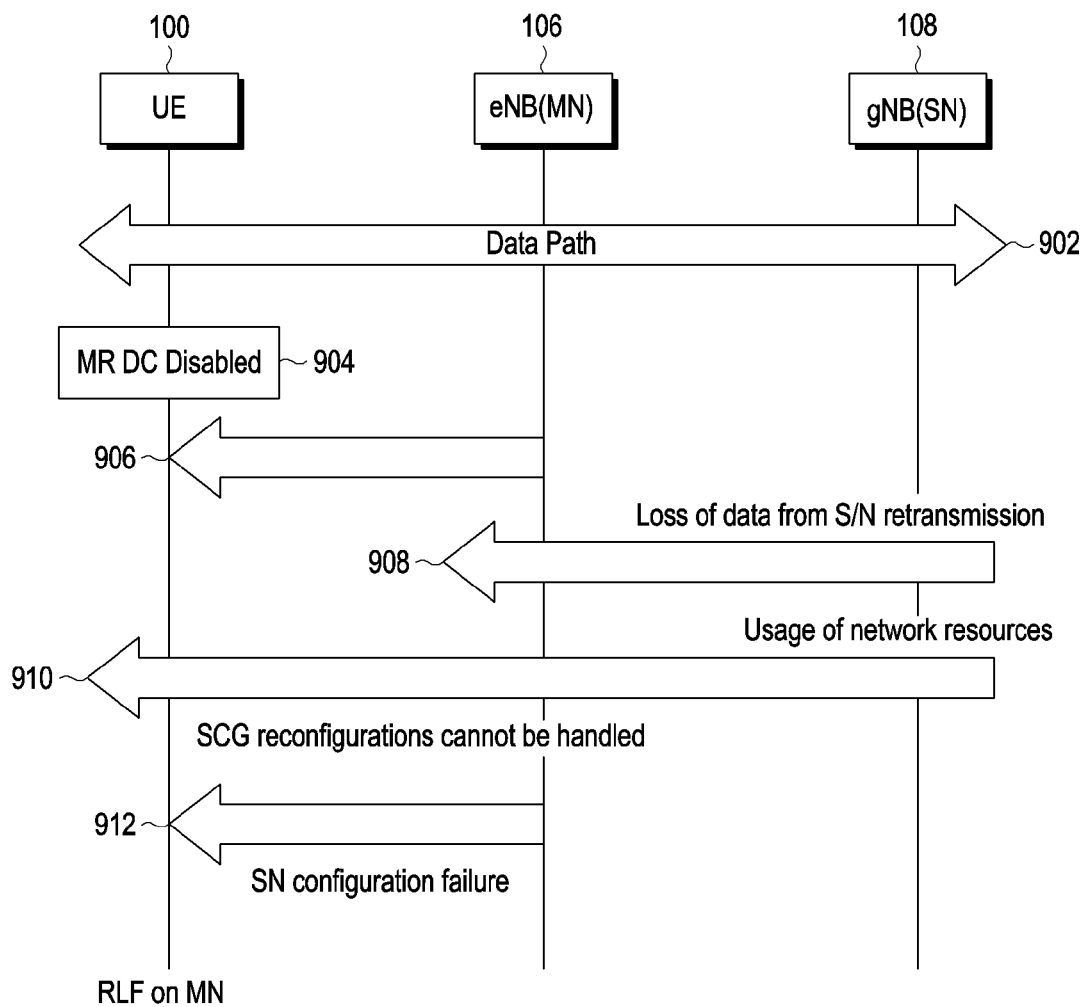

[Fig. 10]
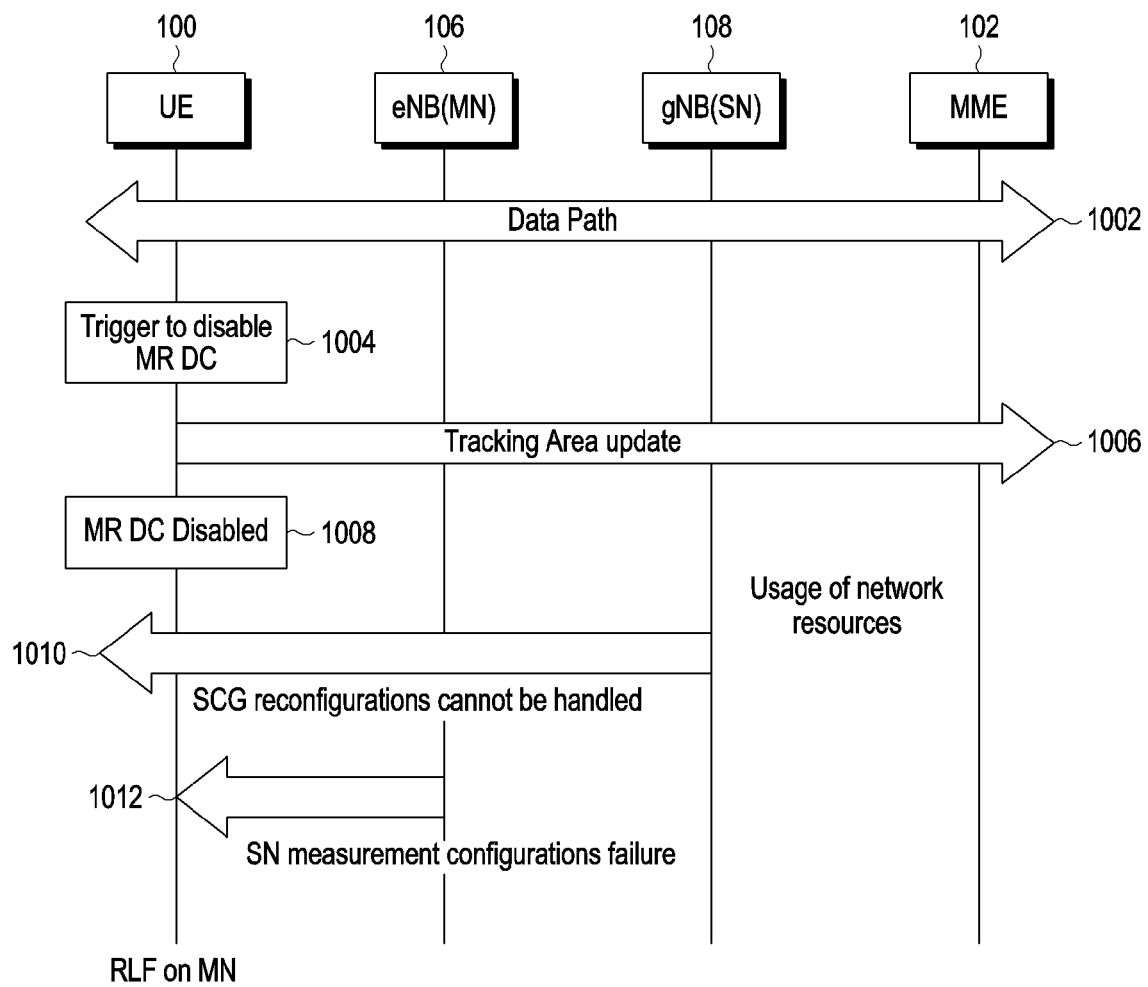

[Fig. 11]
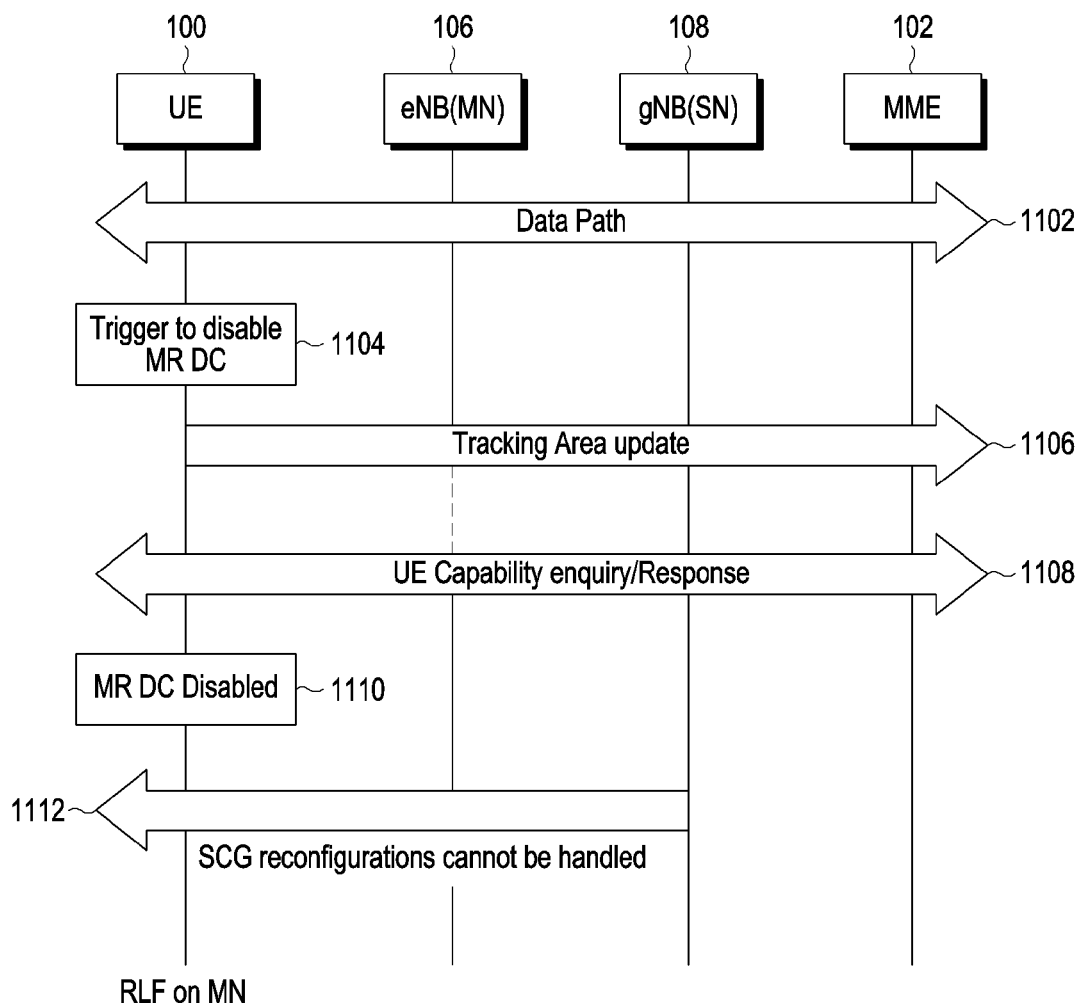

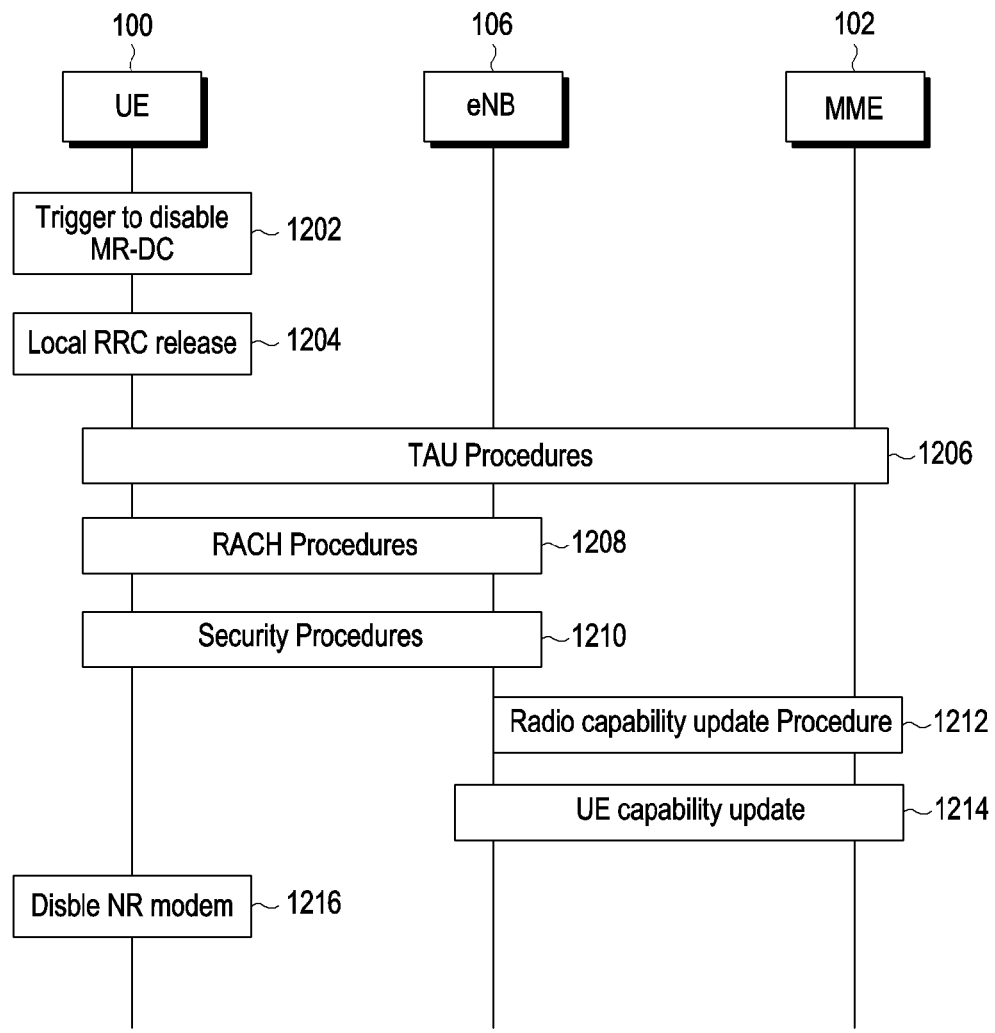
[Fig. 12]

[Fig. 13]
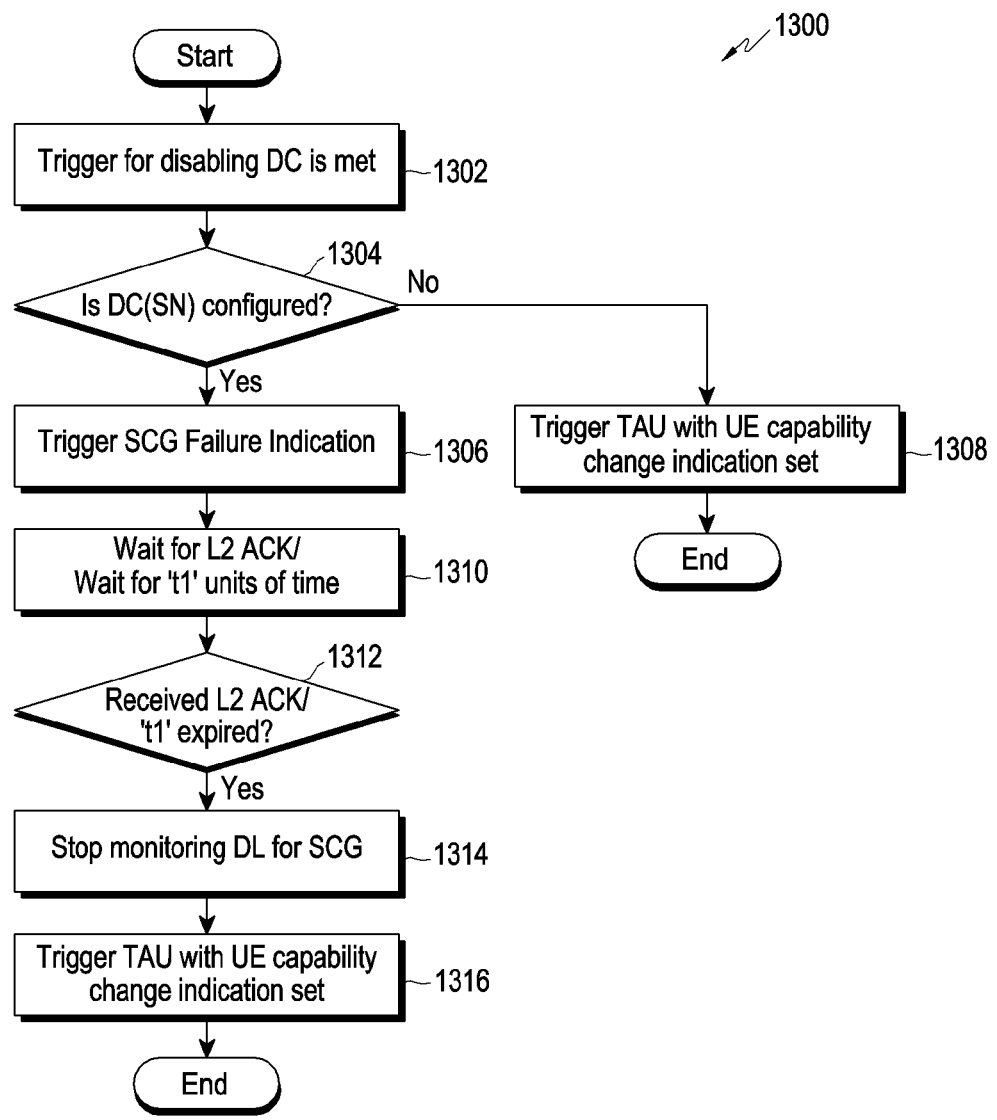

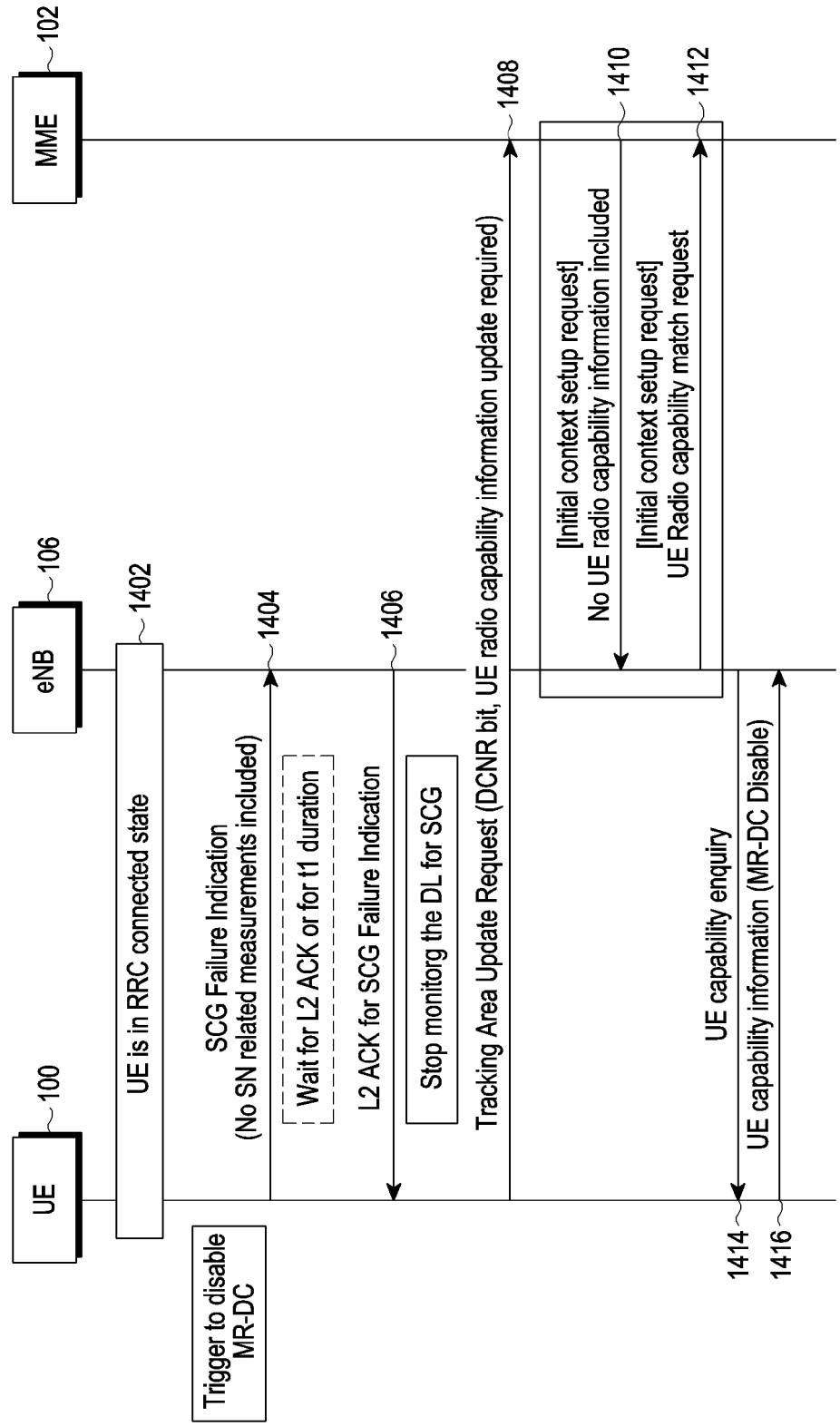
[Fig. 14]

[Fig. 15]
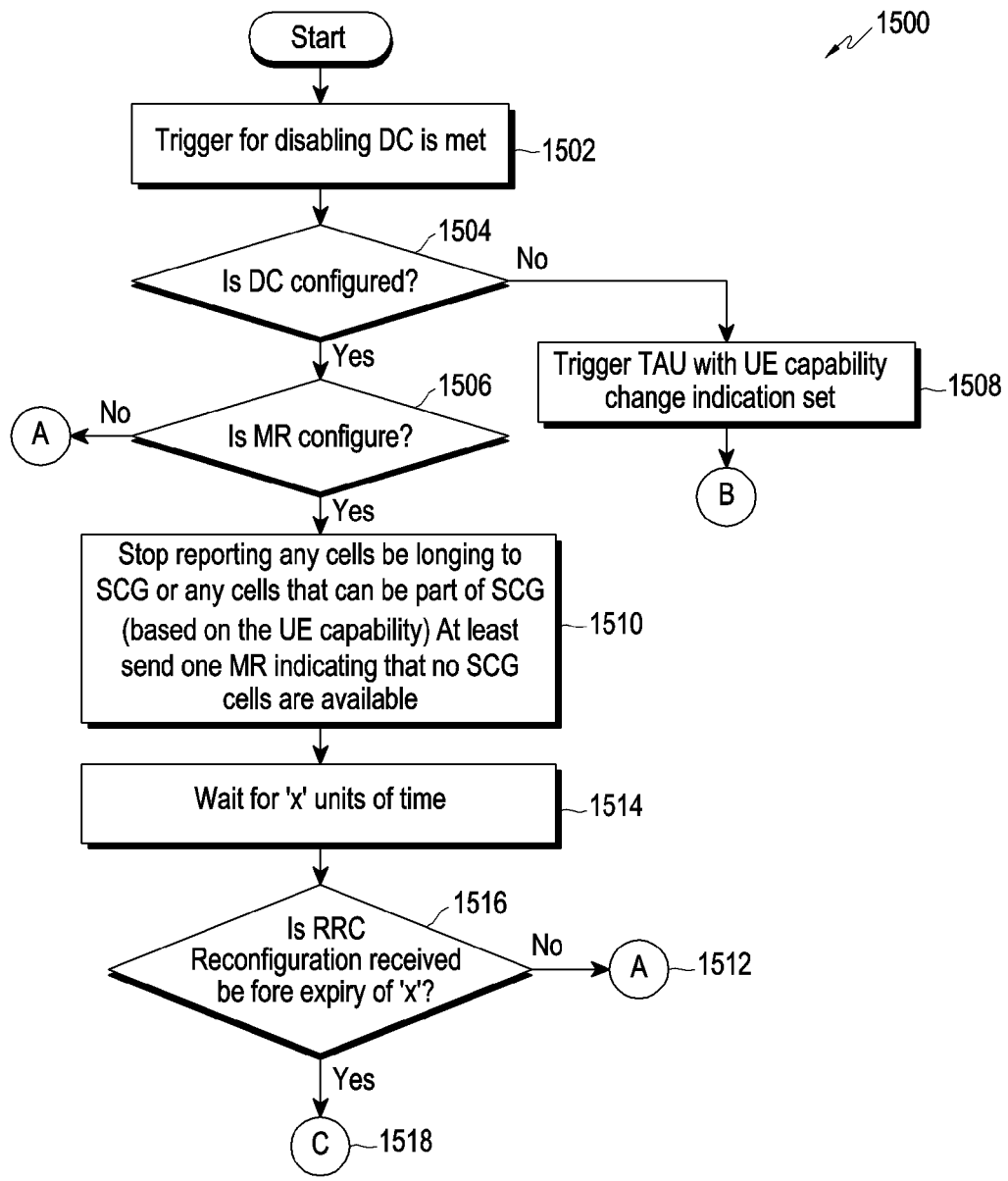

[Fig. 16]
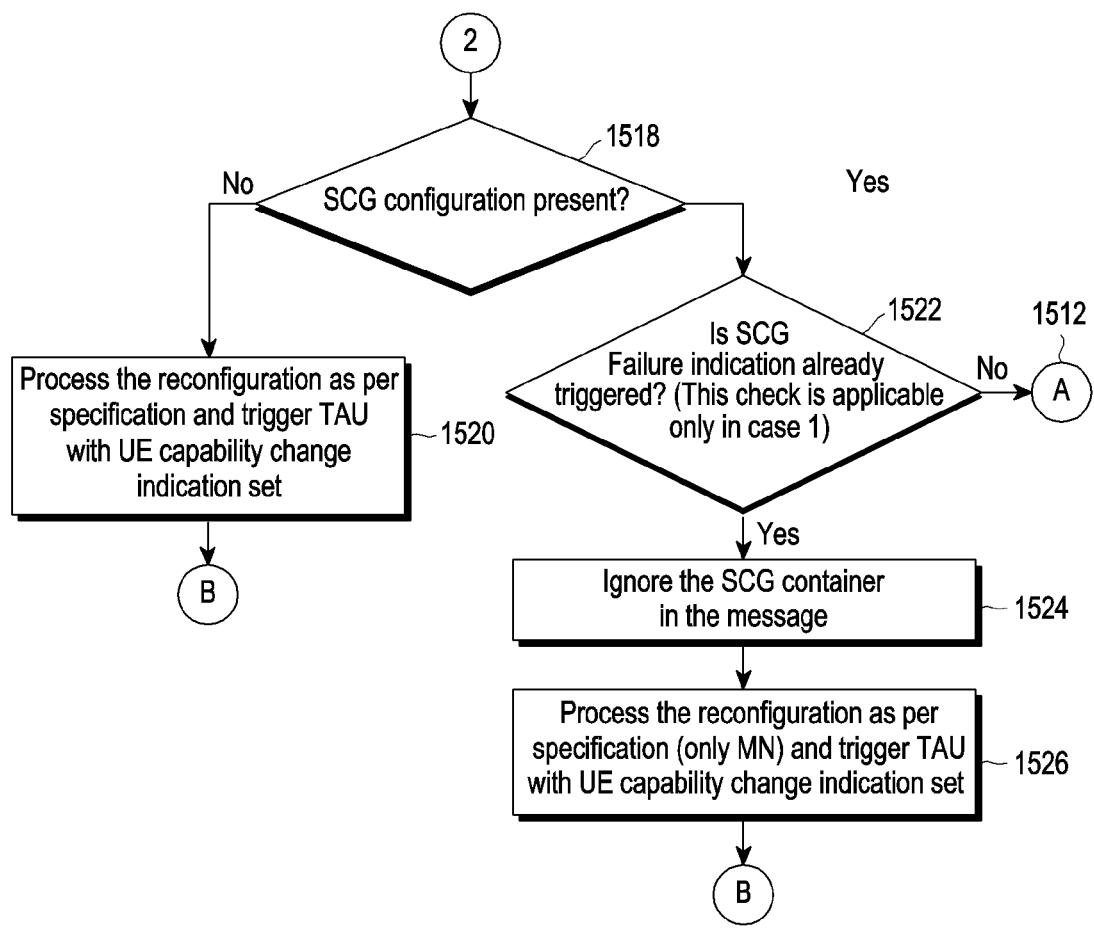

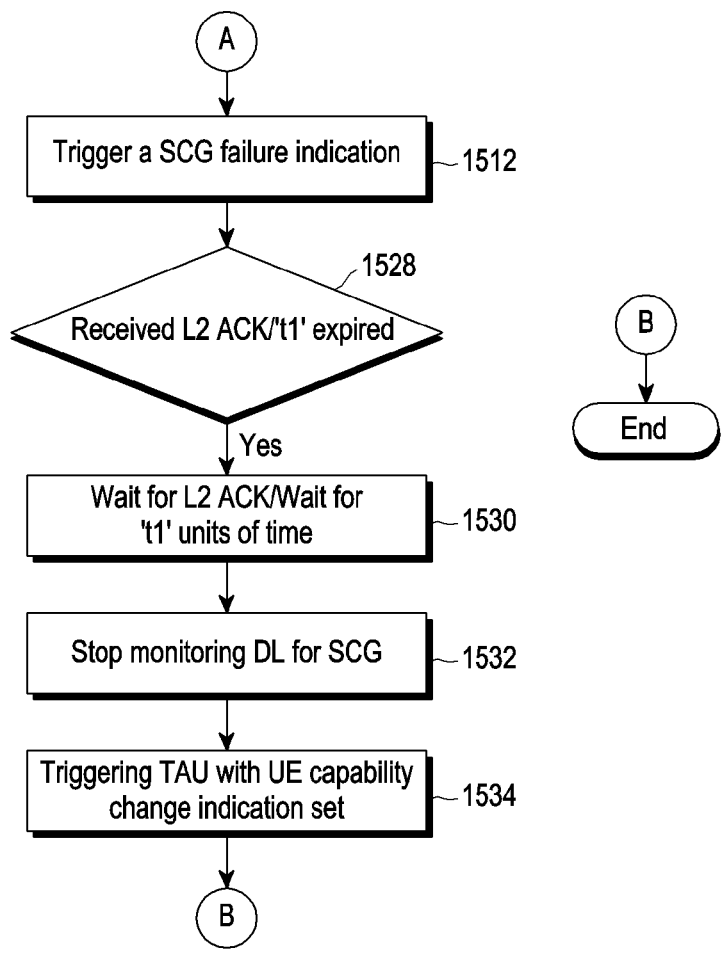
[Fig. 17]

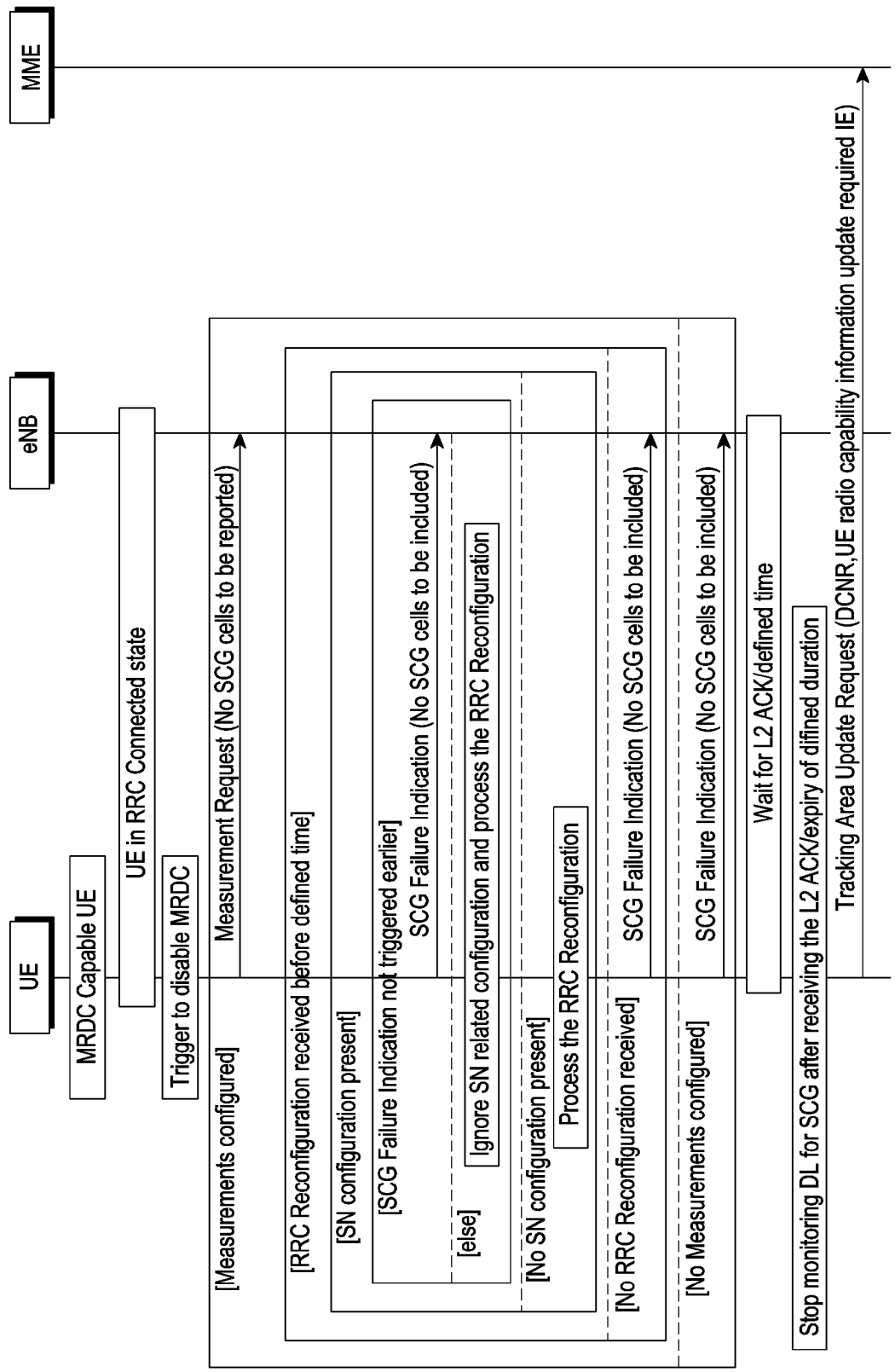
[Fig. 18]

[Fig. 19]
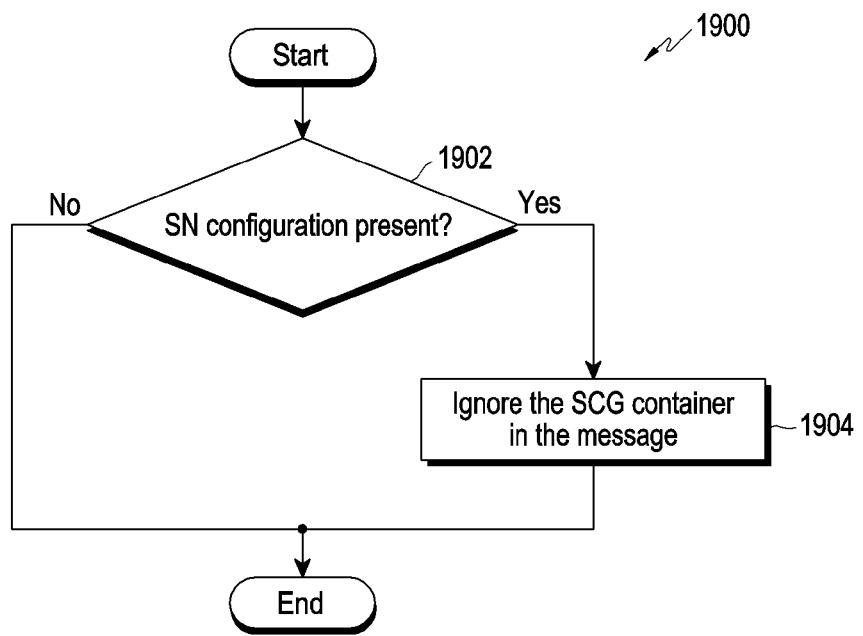

[Fig. 20]
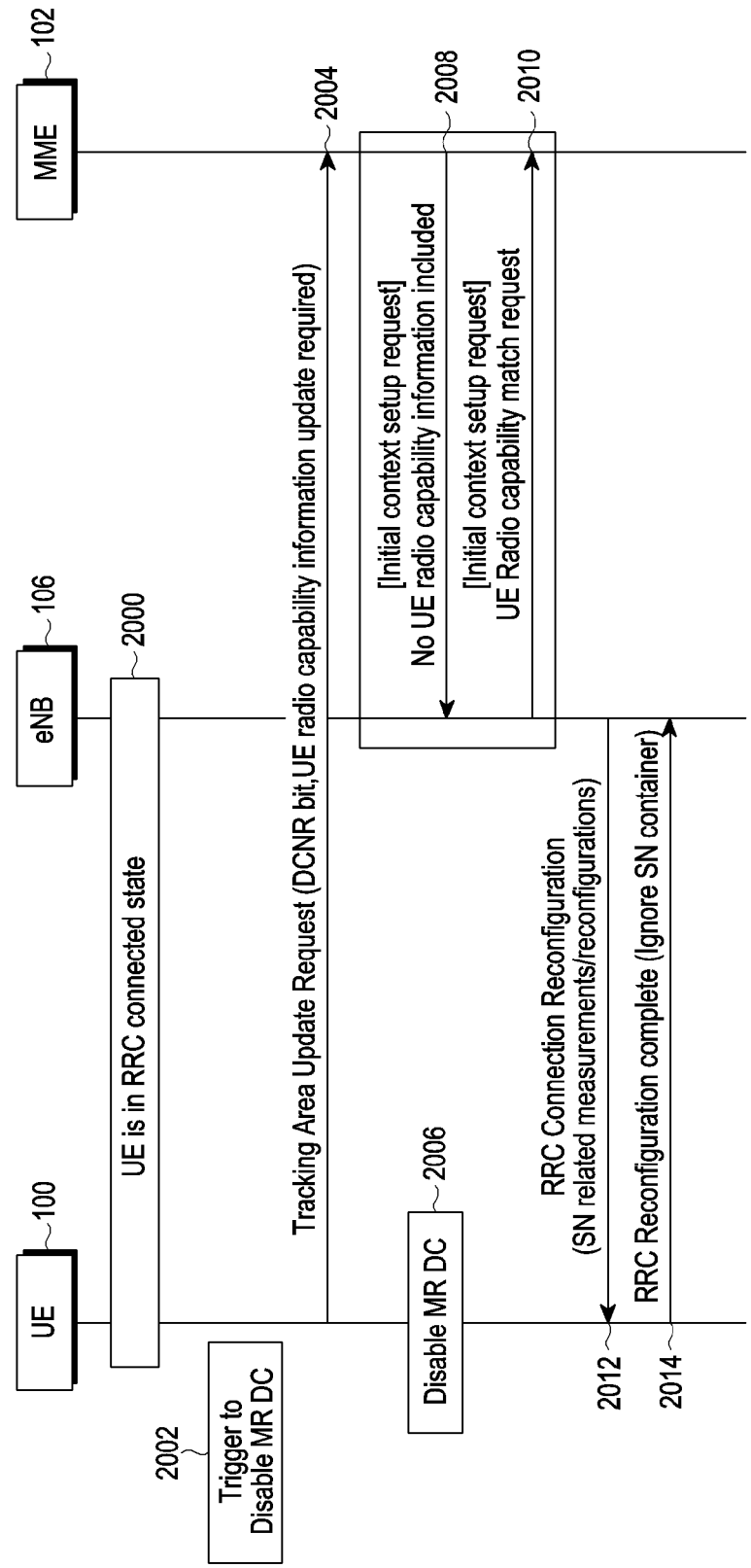

[Fig. 21]
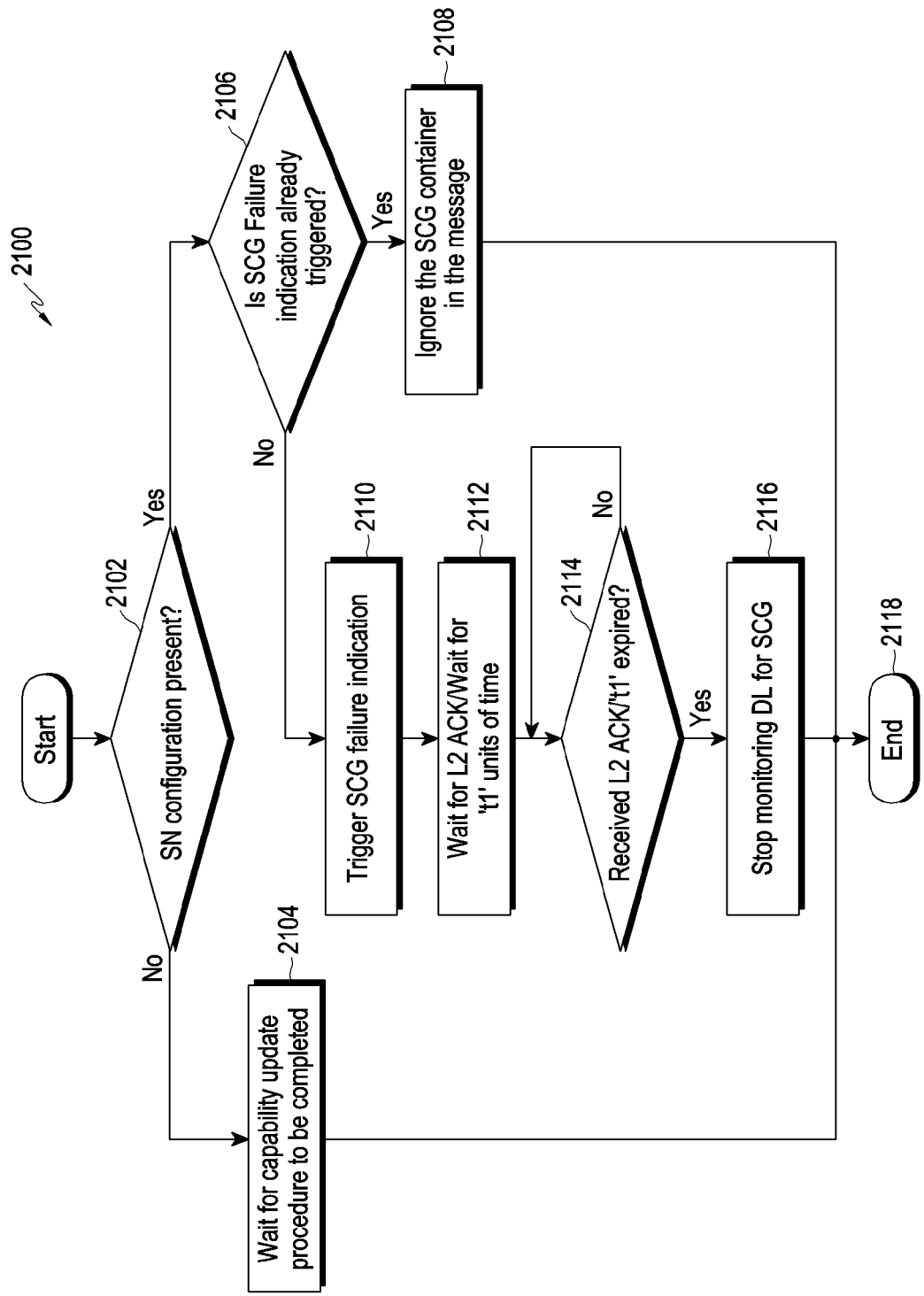

[Fig. 22]
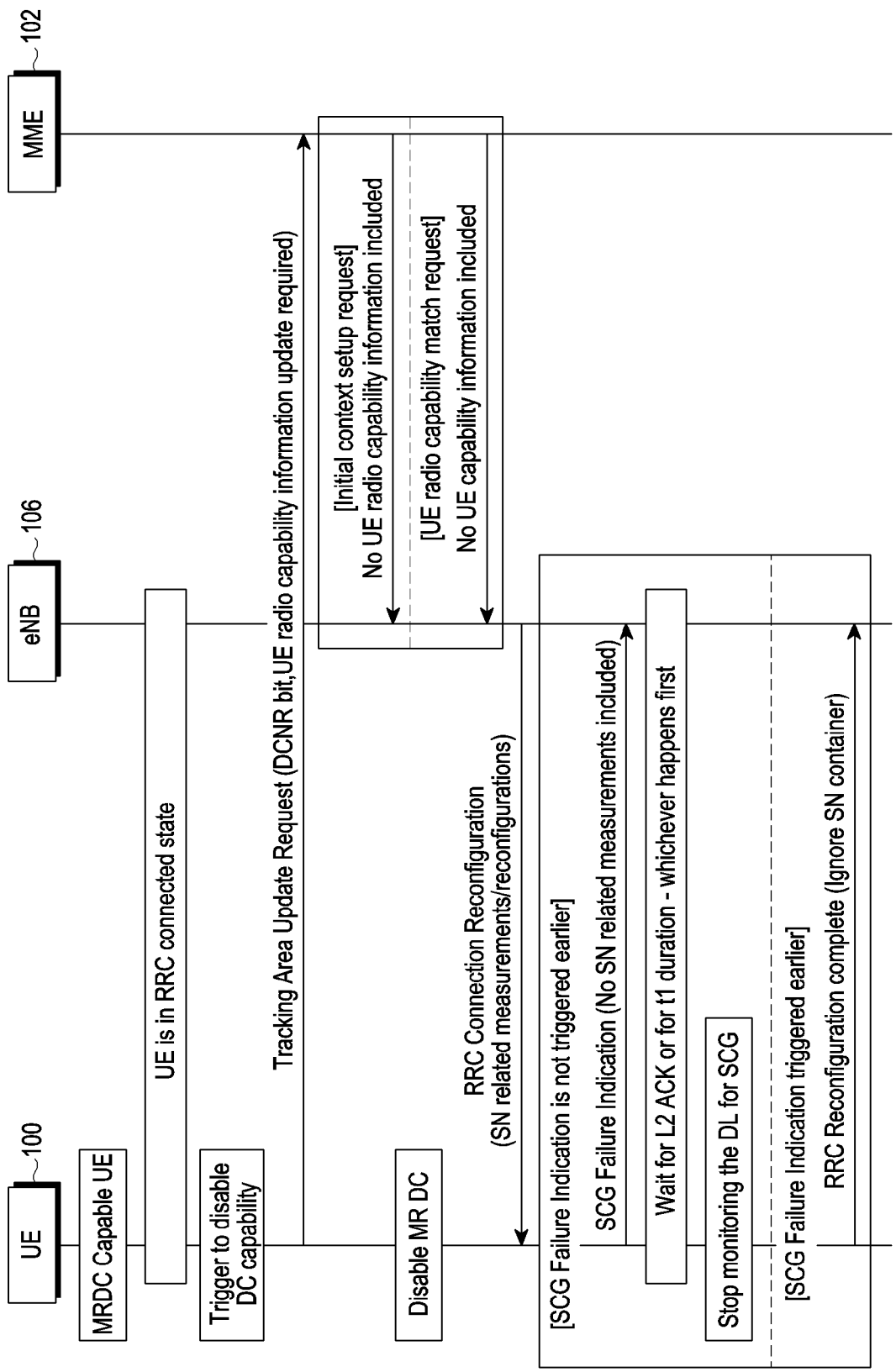

METHOD AND SYSTEM FOR INDICATION OF A CHANGE IN MULTI-RADIO ACCESS TECHNOLOGY DUAL CONNECTIVITY CAPABILITY

CROSS-REFERENCE TO RELATED APPLICATIONS

This application is a National Phase Entry of PCT International Application No. PCT/KR2019/009652, which was filed on Aug. 2, 2019, and claims priority to Indian Provisional Patent Application No. 201841029151, which was filed in the Indian Intellectual Property Office on Aug. 2, 2018, and Indian Complete Patent Application No. 201841029151, which was filed in the Indian Intellectual Property Office on Jun. 11, 2019, the content of each of which are incorporated herein by reference.

BACKGROUND

1. Field

The present disclosure relates to an indication of a change in a dual connectivity capability of a User Equipment (UE) and more specifically to a method for indicating the change in a Multi-Radio Access Technology (RAT) dual connectivity (MR-DC) capability of the UE.

2. Description of Related Art

Multi-RAT Dual Connectivity (MR-DC) refers to a range of different DC configuration options available in a User Equipment (UE) and is largely associated with 5th Generation (5G) cellular mobile communication standards. In the MR-DC, a Master RAN Node (MN) functions as a controlling entity, and utilizes a Secondary RAN Node (SN) for additional data capacity. Examples of MR-DC configurations for the UE include EN-DC (E-UTRA—NR Dual Connectivity) configuration, NR-NR-DC (New Radio-New Radio Dual Connectivity) configuration, NGEN-DC (NG-RAN—E-UTRA Dual Connectivity) configuration, NE-DC (NR—E-UTRA Dual Connectivity) configuration and the like. MR-DC is described as in REL-15 3GPP standards (TS 37.340), where multiple transmitters and receivers (Tx/Rx) at the UE may be configured to utilize radio resources of both NR (New Radio) and EUTRA (Evolved-Universal Terrestrial Radio Access-New Radio) in an ENDC configuration. The UE is connected to eNB (evolved node B) that acts as MN and one gNB (5th Generation node B) that acts as SN. The UE indicates this capability to operate on the MR-DC using UE capability information message to a network node.

Despite the benefits of the MR-DC capability of the UE, it is desirable to disable (or enable) the MR-DC capability dynamically of the UE in certain scenarios, like low battery or high temperature triggers in order to mitigate their effects. The UE has to indicate the networks of its MR-DC capability.

SUMMARY

As defined in 3GPP specifications, the existing system has limitations in realizing signaling overhead to disable/enable the MR-DC capability. Further, the system does not allow the UE capability change in EMM (EPS Mobility Management)-connected state.

The MR-DC capable UE encounters local trigger to deactivate NR modem to disable the MR-DC capability. In conventional method, the UE needs to initiate TAU (Tracking Area Update) procedure and send signaling messages to the RAN for updating the RANs about the deactivation of the NR Modem at the UE. The signaling messages includes RACH (Random access channel) procedures with EUTRAN (Evolved Universal Terrestrial Radio Access Network), security procedure between UE and EUTRAN, radio capability request procedures between MME (Mobile Management Entity) and EUTRAN, the UE capability update between UE and EUTRAN, the UE capability indication between EUTRAN and MME and TAU procedures among the UE, EUTRAN and MME. Thus a lot of signaling message exchanges has to be done among UE, MME and EUTRAN just to update the UE capability.

Thus, it is desired to address the above mentioned problems and at least provide a useful alternative for indicating the change in the dual capability of the UE.

The principal object of the embodiments herein is to provide a method and system for indication of a change in an MR-DC capability of the UE to the RANs and core network.

Another object of the embodiment herein is to hold a Tracking Area Update (TAU) message at the UE while updating the change in the MR-DC capability of the UE to the RANs and core network.

Another object of the embodiment herein is to identify detection of a particular event when the UE is in connected mode.

Another object of the embodiment herein is to identify configuration of UE-assistance information when the UE is in connected mode.

Another object of the embodiment herein is to regulate the indication of a change in the MR-DC capability of the UE to the network node.

Accordingly the disclosure provides a method and system for indication of a change in MR-DC capability of the UE in a network node. The method comprises detecting, by the UE a change in the MR-DC capability of the UE and determining whether the UE is in one of an idle mode and a connected mode. The method further comprises holding a tracking area update (TAU) message at the UE, if the UE is in the idle mode, and determining whether a particular event is detected, and regulating an indication of the change in the MR-DC capability of the UE to the network node based on the detection of the particular event. The particular event comprises at least one of an MO/MT request, a data request, a signaling request, and a SMS request, wherein the particular event configures the UE into the connected mode from an idle mode.

The method further comprises determining whether UE-assistance information is configured by the network node, when the UE is in connected mode and regulating an indication of the change in the MR-DC capability of the UE to the network node based on the configuration of the UE-assistance information with the network node.

In an embodiment, regulating the indication of the change in the MR-DC capability of the UE to the network node based on the configuration of the UE-assistance information with the network node comprises determining that the UE-assistance information is configured by the network node, wherein the regulating further comprises sending a UE-assistance information message indicating the change in the MR-DC capability of the UE.

In another embodiment regulating, the indication of the change in the MR-DC capability of the UE to the network node based on the configuration of the UE-assistance information with the network node comprises determining, that the UE-assistance information is not configured by the network node. The regulating further comprises determining, whether a dual capability (DC) for a secondary node (SN) is configured. If the DC for the SN is not configured, then a TAU message comprising the indication of the change in the MR-DC capability of the UE to the network node is triggered. If the DC for the SN is configured then a secondary cell group (SCG) failure indication message is triggered and a timer is initiated to receive an acknowledgement of the SCG failure indication message. Further it is determined whether the timer is expired and the acknowledgement of the SCG failure indication message is not received or the acknowledgement of the SCG failure indication message is received before expiry of the timer and then the TAU message comprising the indication of the change in the MR-DC capability of the UE to the wireless node is triggered.

In another embodiment regulating, the indication of the change in the MR-DC capability of the UE to the network node based on the configuration of the UE-assistance information, comprises determining, that the UE-assistance information is not configured by the network node and determining, whether a dual capability (DC) for a secondary node (SN) is configured. If the DC for the SN is not configured, then a TAU message comprising the indication of the change in the MR-DC capability of the UE to the network node is triggered. If the DC for the SN is configured then it is determined whether a Measurement Report (MR) is configured for the network node and the TAU message indicating the change in the MR-DC capability of the UE to the wireless node is triggered based on the configuration of the MR for the network node.

In an embodiment, triggering the TAU message based on the configuration of the MR for the network node comprises, determining that the MR is not configured for the network node and triggering a secondary cell group (SCG) failure indication message. The method further comprises initiating a timer to receive an acknowledgement of the SCG failure indication message. Further it is determined whether the timer is expired and the acknowledgement of the SCG failure indication message is not received or the acknowledgement of the SCG failure indication message is received before expiry of the timer. The TAU message comprising the indication of the change in the MR-DC capability of the UE to the wireless node is triggered.

In an embodiment, triggering the TAU message based on the configuration of the MR for the network node comprises, determining that the MR is configured for the network node and sending at least one MR indicating unavailability of SCG cells. The method further comprises initiating a timer to receive a RRC reconfiguration message from the network node and determining, whether the RRC reconfiguration message is received before expiry of the timer. The method further includes triggering a secondary cell group (SCG) failure indication message if the RRC reconfiguration message is not received before expiry of the timer, and initiating a timer to receive an acknowledgement of the SCG failure indication message. Further the method includes determining that the timer is expired and the acknowledgement of the SCG failure indication message is not received or the acknowledgement of the SCG failure indication message is received before expiry of the timer, and triggering the TAU message comprising the indication of the change in the MR-DC capability of the UE to the wireless node. If the RRC reconfiguration message is received before expiry of the timer then the TAU message indicating the change in the MR-DC capability of the UE to the wireless node is triggered.

In an embodiment the triggering the TAU message comprising the indication of the change in the MR-DC capability of the UE to the wireless node in response to determining that the RRC reconfiguration message is received before expiry of the timer comprises determining, whether an SCG configuration is available. The method further includes processing the RRC reconfiguration message if the SCG configuration is not available, and triggering the TAU message comprising the indication of the change in the MR-DC capability of the UE to the wireless node. The method further includes ignoring an SCG container in the RRC reconfiguration message indication message if the SCG configuration is available, and processing the RRC reconfiguration message, and triggering the TAU message comprising the indication of the change in the MR-DC capability of the UE to the wireless node.

Accordingly the embodiments herein provide a User Equipment (UE) for indication of a change in Multi-Radio Access Technology (RAT) dual connectivity (MR-DC) capability of the UE to the RAN and core networks. The UE includes a processor, a memory and an MR-DC connectivity indicator. The MR-DC connectivity indicator includes a TAU trigger, an event detector and a timer. The MR-DC connectivity indicator is configured to detect the change in the MR-DC capability of the UE and to determine, whether the UE is in one of an idle mode and a connected mode. The TAU trigger is configured to hold the tracking area update (TAU) message at the UE if the UE is in the idle mode. The event trigger is configured to determine whether a particular event is detected. Further the MR-DC connectivity indicator regulates an indication of the change in the MR-DC capability of the UE to the network node based on the detection of the particular event by the event trigger. The DC connectivity indicator further determines whether UE-assistance information is configured by the network node if the UE is in the connected mode. The DC connectivity indicator further regulates an indication of the change in the MR-DC capability of the UE to the network node based on the configuration of the UE-assistance information with the network node.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which:

FIG. 1 is a system diagram of a UE with Multi Rat Dual Connectivity capability and communicating with the eNB, gNB, MME and the S-GW, according to a prior art;

FIG. 2 is a sequence diagram illustrating the signaling procedure of updating the EUTRAN and the MME of the change in the MR-DC capability of the UE in an existing system, according to a prior art;

FIG. 3 is a block diagram of the UE, according to an embodiment as disclosed herein;

FIG. 4 is a flow diagram of sending TAU messages to the EUTRA and the MME when the UE is in idle mode, according to an embodiment as disclosed herein;

FIGS. 5a and 5b are a sequence diagram of updating the EUTRAN and the MME of the change in the MR-DC capability of the UE when the UE is in idle mode, according to an embodiment as disclosed herein;

FIG. 6a is a sequence diagram of the existing system in an example scenario, illustrating RACH failures during the indication of the MR-DC capability change, according to the prior art;

FIG. 6b is a comparison sequence diagram of the proposed method with the existing system in the example scenario of FIG. 6a according to an embodiment as disclosed herein;

FIG. 7 is a flow diagram of the proposed method when the UE is in connected mode, according to an embodiment as disclosed herein;

FIG. 8 is a sequence diagram of the proposed method when the UE is in connected mode, according to an embodiment as disclosed herein;

FIG. 9 is a sequence diagram for conventional method indicating the change in the MR-DC capability of the UE when the UE 100 is in connected mode;

FIG. 10 is a sequence diagram for conventional method indicating the change in the MR-DC capability of the UE when the UE is in connected mode, and the UE-assistance information is not configured by the network;

FIG. 11 is a sequence diagram for conventional method indicating the change in the MR-DC capability of the UE when the UE is in connected mode, and the UE-assistance information is not configured by the network;

FIG. 12 is a sequence diagram for conventional method indicating the change in the MR-DC capability of the UE when the UE is in connected mode, and the UE-assistance information is not configured by the network;

FIG. 13 is a flow diagram for the proposed method, when the UE 100 is in connected mode, according to an embodiment as disclosed herein;

FIG. 14 is a sequence diagram for method flow, indicating the change in the MR-DC capability of the UE when the UE is in connected mode, according to an embodiment as disclosed herein;

FIG. 15 is a flow diagram for indicating the change in the MR-DC capability of the UE 100 when the UE is in connected mode, according to an embodiment as disclosed herein;

FIG. 16 is a continuation of flow diagram of FIG. 15, according to an embodiment as disclosed herein;

FIG. 17 is a continuation of flow diagram of FIGS. 15 and 16 according to an embodiment as disclosed herein;

FIG. 18 is a sequence diagram for method flow, indicating the change in the MR-DC capability of the UE when the UE is in connected mode, according to an embodiment as disclosed herein;

FIG. 19 is a flow diagram for indicating the change in the MR-DC capability of the UE when the UE is in connected mode, according to an embodiment as disclosed herein;

FIG. 20 is a sequence diagram for the flow shown in FIG. 19, according to an embodiment as disclosed herein;

FIG. 21 is a flow diagram for indicating the change in the MR-DC capability of the UE when the UE is in connected mode, according to an embodiment as disclosed herein;

FIG. 22 is a sequence diagram for the flow shown in FIG. 21, according to an embodiment as disclosed herein.

DETAILED CLAIMS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein disclose a method for indicating the change in the MR-DC capability of the UE to the network node. The method comprises detecting a change in the MR-DC capability of the UE and determining, whether the UE is in one of an idle mode and a connected mode. The method further comprises holding a tracking area update (TAU) message at the UE, if the UE is in the idle mode, and determining whether a particular event is detected, and regulating an indication of the change in the MR-DC capability of the UE to the network node based on the detection of the particular event. The particular event comprises at least one of an MO/MT request, a data request, a signalling request, and a SMS request, and wherein the particular event configures the UE into the connected mode. The method further comprises determining whether UE-assistance information is configured by the network node, when the UE is in connected mode and regulating an indication of the change in the MR-DC capability of the UE to the network node based on the configuration of the UE-assistance information with the network node.

Unlike conventional methods and systems, the proposed method reduces signaling overhead and ensures successful indication of the change in MR-DC capability of the UE to the network node. The proposed method also ensures indication of the change in MR-DC capability of the UE to the network node while in a connected mode. In conventional systems, the UE is first changes to idle mode and then the indication is sent to the network node.

Referring now to the drawings, and more particularly to FIGS. 3 through 22, where similar reference characters denote corresponding features consistently throughout the figures, there are shown preferred embodiments.

FIG. 1 represents a system diagram of a UE 100 with an MR-DC capability. As seen in FIG. 1 the UE 100 is in connection with both an LTE (Long Term Evolution) eNB 106 and an NR (New Radio) gNB 108. The eNB 106 is a master node (MN) and the gNB 108 is a secondary node (SN). The eNB 106 and the gNB 108 are connected to an S-GW 104 (Serving Gateway) which acts as a core network. The eNB 106 is also connected to an MME 102 (Mobile Management Entity) which is also a part of the core network. The MR-DC capability of the UE 100 needs to be changed dynamically that is the dual capability of the UE 100 may be enabled or disabled based on an occurrence of a local trigger event from the UE 100. The local trigger event may be at least one of a low battery trigger, a high temperature trigger and the like. In order to mitigate the effect of the local trigger event it is necessary to deactivate the secondary RAT (secondary modem) (SN) 108 from the dual connectivity of the UE 100. Thus the MR-DC capability of the UE 100 needs to be disabled. This change in the MR-DC capability of the UE 100 has to be indicated to the core network MME 102 and S-GW 104.

In conventional method, in order to indicate the change in the MR-DC capability of the UE 100 to the core network S-GW 104 and MME 102, a TAU procedure is initiated by the UE 100. Signaling messages get exchanged between the UE 100, eNB 106, gNB 108 and the core network MME 102 and S-GW 104, when the TAU procedure is initiated. The signaling messages includes RACH procedures between the UE 100, the eNB 106 and the gNB 108, security procedure between UE 100, eNB 106, and gNB 108 and radio capability request procedures between S-GW 104, MME 102, eNB 106 and the gNB 108, the UE capability update between the UE 100, the eNB 106, and the gNB 108, the UE capability indication between the enb 106, the gnb 108, the S-GW 104 and the MME 102 and TAU procedures between the UE 100, the eNB 106, the gNB 108, the S-GW 104 and the MME 102. A lot of signaling message exchanges has to be done, just to update the UE capability between the UE 100, the MME 102, the gNB 108 and the eNB 106. There arises a problem of signaling overhead whenever the MR-DC capability of the UE 100 has to be enabled again. Further when the local trigger event is occurring frequently, the MR-DC capability of the UE 100 needs to be changed and thus for every change in the MR-DC capability, the TAU procedures, the security procedure and the other signaling has to be done. This results in ping pong effect. Further there may be an RACH procedure failure due to temporary network condition or signal conditions.

FIG. 2 depicts a sequence diagram illustrating the signaling procedure of updating the eNB 106 and the MME 102 of the change in the MR-DC capability of the UE 100 for the conventional method. The TAU procedure relates to a series of procedures performed by the UE 100 for updating the Tracking Area (TA). As seen in FIG. 2 the TAU procedure (202) is initiated between the UE 100 and the MME 102. After initiating the TAU procedure (202), an RACH procedure (204) between the UE 100 and eNB 106 has to be exchanged. The signaling further includes exchanging a security procedure (206) between the UE 100 and eNB 106. A radio capability request procedures (208) between the MME 102 and the eNB 106 is also exchanged. The UE capability update between the UE 100 and the eNB 106 and the UE capability indication between the eNB 106 and the MME 102 is also exchanged. The TAU procedures between the UE 100, the eNB 106 and the MME 102 are also initiated. Thus a lot of signaling message exchanges need to happen just to update the UE capability between the UE 100, the MME 102 and the eNB 106. There arises a problem of signaling overhead whenever the UE 100 has to change the mode. Further when the local trigger is occurring frequently, the MR-DC capability of the UE 100 needs to be changes and thus for every change in the MR-DC capability, the TAU procedures, the security procedure and the other signaling has to be done. This results in ping pong effect. Further there may be an RACH procedure failure due to temporary network condition or signal conditions. Further when the UE 100 is in connected mode the prior arts/conventional system and method discloses changing the UE 100 to idle mode first and then updating the network about the changed MR-DC capability of the UE 100. However, conventional systems and method does not state anything about updating the MR-DC capability while the UE 100 is in the connected mode. The proposed system and method provides a solution to the above said problems. The proposed system and method also provide the feature of updating the MR-DC capability while the UE 100 is in the connected mode.

FIG. 3 discloses a UE 100 for the proposed method for indicating the change in the MR-DC capability of the UE 100 to the MME 102 and the eNB 106. The examples for the UE 100 are, but not limited to a smart phone, a tablet computer, a personal computer, a desktop computer, a mobile device, a personal digital assistance (PDA), a multimedia device, an Internet of Things (IoT) and the like. The UE 100 is an MR-DC capable UE. The UE 100 may comprise multiple transceivers Tx/Rx and is configured to utilize radio resources of both NR (New Radio) and EUTRA (Evolved-Universal Terrestrial Radio Access-New Radio). The UE 100 may be connected to one eNB that acts as an MN 106 (Master Node) and one gNB that acts as SN (secondary node) 108. The MR-DC capability of the MR-DC capable UE 100 has to be enabled/disabled dynamically based on the occurrence of the local trigger. The change in the MR-DC capability of the UE 100 has to be indicated to the EUTRA 106 and the MME 102. The UE 100 may be in a connected mode or an idle mode with respect to the network. In the idle mode, the UE 100 has no signaling or data bearers associated with it. In other words, no network/radio resources are allocated to the UE 100. In the connected mode, the UE is associated with the network/radio resources.

The UE 100 comprises a memory 310, a processor 320, and an MR-DC connectivity regulator 330. The MR-DC connectivity regulator 330 comprises a TAU trigger 332, an event detector 334 and a timer 336. The MR-DC connectivity regulator 330 is configured to indicate the change in the MR-DC capability of the UE 100 to the MME 102 and the eNB 106.

In an embodiment the MR-DC connectivity regulator 330 detects the change in the MR-DC capability of the UE 100. The MR-DC connectivity regulator 330 is configured to determine whether the UE 100 is in one of the idle mode and the connected mode. If the UE 100 is in the idle mode then the TAU trigger 332 holds the TAU message at the UE 100. The event detector 334 then determines whether an event is detected, and the MR-DC connectivity regulator 330 regulates an indication of the change in the MR-DC capability of the UE 100 to the MME 102 and the eNB 106 upon detection of the event. The event comprises at least one of a Mobile terminated/Mobile originated (MO/MT) request, a data request, a signaling request, and an SMS request, which configures the UE 100 into the connected mode. In an example the MO/MT trigger is a trigger by the UE 100 establishing the connection with the network either for mobile originated or mobile terminated cases.

If the UE 100 is in the connected mode the MR-DC connectivity regulator 330 determines whether UE-assistance information is configured by the network node. The TAU trigger 332 triggers the message indicating the change in the MR-DC capability of the UE 100 to the MME 102 and the EUTRA based on the configuration of the UE-assistance information with the network node.

In an embodiment, a secondary cell group (SCG) failure indication message is triggered by the MR-DC connectivity regulator 330. The timer 336 is initiated to receive an acknowledgement of the SCG failure indication message. The MR-DC connectivity regulator 330 determines that the timer 336 is expired and the acknowledgement of the SCG failure indication message is not received or the acknowledgement of the SCG failure indication message is received before expiry of the timer 336. The TAU trigger 332 triggers the message indicating the change in the MR-DC capability of the UE 100 to the EUTRA and the MME, in response to determining that the DC for the SN is configured.

FIG. 4 shows a flow diagram 400 for sending TAU messages to the EUTRA 106 and the MME 102 when the UE 100 is in an idle mode. As shown in FIG. 4, at step 402 the local trigger is received. The MR-DC capability of the UE 100 is enabled/disabled based on the local trigger. At step 404, the MR-DC connectivity regulator 330 determines whether the UE is in the idle mode or connected mode. The method proceeds to step 406 if the UE 100 is in the idle mode and to 2 if the UE 100 is in the connected mode. At step 406, the TAU trigger 332 keeps the TAU message pending at the UE 100. At step 410, the MO/MT (mobile originated/mobile terminated) trigger is received. At step 412 after receiving the MO/MT trigger the TAU trigger 332 sends the TAU messages to the network indicating the change in the MR-DC capability of the UE 100.

FIGS. 5a and 5b disclose a sequence diagram of the flow 400 explaining the updating of the EUTRAN and the MME 102 of the change in the MR-DC capability of the UE 100 when the UE 100 is in the idle mode. The sequence diagram shows the UE 100, the EUTRA 106 and the MME 102. The sequence diagram explains the process of indicating the MR-DC capability of the UE 100 to the network when the UE 100 is in the idle mode. As shown in the FIG. 5a, the trigger to disable the MR-DC is received, while the UE 100 is in the idle mode. The TAU messages are kept pending at the UE 100 by the TAU trigger 322 until the MO/MT trigger is received. As shown in FIG. 5a, the MO/MT trigger is received and the UE 100 checks if the trigger to disable the MR-DC capability of the UE still exists. If the trigger to disable the MR-DC capability of the UE 100 is valid then the UE 100 requests an RRC (Radio Resource Control) to send the TAU messages with radio capability update to the network. The RRC connection has to be established with the EUTRA 106 to send the MR-DC capability update of the UE 100 to the network. As shown in the FIG. 5a, an RACH procedure is followed. The RACH procedure refer to the first message from the UE 100 to the eNB 106, when the UE 100 is powered and is used for uplink synchronization between the UE 100 and the eNB 106. A Random Access Preamble (MSG1) is sent to the EUTRA 106. A Random Access Response (MSG2) is received by the UE from the EUTRA 106. An RRC Connection Request (MSG3) is sent to the EUTRA 106. In response to the RRC connection request, an RRC Connection Setup (MSG4) is received by the UE 100. The RRC connection is completed and the TAU message is encapsulated and the uplink information transfer is done as the message is sent to the EUTRA 106. The EUTRA 106 sends the TAU messages to the MME 102. The MME 102 receives a message for disabling the MR-DC capability of the UE 100 in its database. As shown in the FIG. 5b, the MME 102 sends an initial context setup request to the EUTRA 106, and then the MME sends a UE MR-DC capability match request to the EUTRA 106. The EUTRA 106 checks the UE 100 for the MR-DC capability of the update. Upon receiving the response from the UE 100 about the MR-DC capability information, the EUTRA 106 forwards the update in the MR-DC capability of the UE 100 to the MME 102. The MME 102 disables the MR-DC capability of the UE 100 and sends downlink information to the EUTRA 106 indicating that the TAU message indicating the change in the MR-DC capability of the UE 100 is accepted. The EUTRA 106 sends the TAU accept message to the UE 100. The UE then sends uplink information stating that the TAU procedure is complete to the EUTRA 106. The EUTRA 106 then forwards it to the MME 102.

FIG. 6a shows the time diagram for indicating the change in the MR-DC capability of the UE 100 when the UE 100 is in the idle mode for conventional methods. FIG. 6b shows the time diagram for indicating the change in the MR-DC capability of the UE 100 when the UE 100 is in the idle mode for the proposed method. As can be seen in FIG. 6a there is an RACH failure, while updating the MR-DC capability of the UE 100, whereas in FIG. 6b the RACH failure is avoided, as the TAU procedure is kept pending at the UE 100.

FIG. 7 is a flow diagram 700 for indicating the change in the MR-DC capability of the UE 700 when the UE 100 is in the connected mode, according to an embodiment as disclosed herein. As shown in FIG. 7 the UE 100 is determined to be in the connected mode at step 408. At step 702 it is determined whether UE-assistance information is configured to the network. In an embodiment the UE-assistance information comprises an Information Element (IE) indicating the change in the MR-DC capability of the UE (100).

In an example embodiment a UE-assistance information message is used for the indication to the eNB 106. The UE-assistance information message may perform the following function but not limited to informing the eNB 106 about a power saving preference. Upon configuring the UE 100 to provide power preference indications, the eNB 106 may consider that the UE 100 does not prefer a configuration primarily optimised for power saving until the UE 100 explicitly indicates otherwise. For example, the UE-assistance information message is used but not limited to indicate the power preference of the UE to the network.

The method proceeds to step 704 if the UE assistance information is configured to the network and to step 706 if the UE-assistance information is not configured to the network. At step 704, the UE assistance information is sent to update the change in the MR-DC capability of the UE 100.

FIG. 8 is a sequence diagram for the flow 700 disclosed in FIG. 7, for indicating the change in the MR-DC capability of the UE 100 when the UE 100 is in the connected mode, and the UE-assistance information is configured to the network, according to an embodiment as disclosed herein. As shown in the FIG. 8, the UE 100 is an MR-DC capable UE at step 802, and the UE 100 is in the RRC connected state at step 804. The trigger to disable/enable the MR-DC capability of the UE 100 is received by the UE 100 at steps 806 and 808. As seen in FIG. 8 the UE-assistance information is configured to the network. The trigger to disable/enable the MR-DC capability of the UE 100 is received. After receiving the trigger for the change in the MR-DC capability of the UE 100, the request for change in the MR-DC capability of the UE 100 is sent to the eNB 106 at step 810, and in response the SN 108 is released by the eNB 106 at step 812. The RRC connection update is also received by the UE 100 from the eNB 106 at step 814. The UE 100 thus is in the idle mode at steps 816 and 818. The procedure explained FIGS. 4 and 5*a*-5*b* for sending the TAU procedures is followed for the UE 100.

FIG. 9 is a sequence diagram for conventional method indicating the change in the MR-DC capability of the UE 100 when the UE 100 is in the connected mode, and the UE-assistance information is not configured to the network, according to an embodiment as disclosed herein. FIG. 9 explains a scenario where the UE 100 is in the connected mode and is MR-DC enabled. A data path is established for the UE 100, the eNB 106, and the gNB 108. The MR-DC capability of the UE 100 is disabled upon receiving the trigger for disabling the MR-DC capability of the UE 100. As seen in the FIG. 9 the MR-DC capability of the UE 100 is disabled/enabled upon occurrence of the local trigger without sending the TAU to the SN 108 and MN 106. The disabling/enabling of the MR-DC capability of the UE 100 before sending the TAU procedure results in loss of data from the SN 108 as the change in the MR-DC capability of the SN 108 is not updated and is sending the data to the UE 100. Further for conventional application the network resources are utilized unnecessarily by the SN for retransmitting as the transmission results into a failure. In an example the SN 108 sends SCG reconfiguration messages to the UE 100. However, the UE 100 is unable to recognize the SCG reconfiguration messages sent by the SN 108 as the UE 100 is MR-DC disabled. Thus as discussed above, changing the MR-DC capability of the UE 100 before sending the TAU messages to the MN 106 and the SN 108, while the UE 100 is in connected mode, results into plurality of disadvantages.

FIG. 10 is a sequence diagram for conventional method indicating the change in the MR-DC capability of the UE 100 when the UE 100 is in the connected mode, and the UE-assistance information is not configured to the network, according to an embodiment as disclosed herein. FIG. 10 explains a scenario where the UE 100 is in the connected mode and is MR-DC enabled. The MR-DC capability of the UE 100 is disabled upon receiving the trigger for disabling the MR-DC capability of the UE 100. As seen in the FIG. 10 the MR-DC capability of the UE 100 is disabled/enabled upon occurrence of the local trigger after sending the TAU message to the MME 102. Here the MME 102 is aware about the change in the MR-DC capability of the UE 100 due to the TAU messages; however the MN 106 and the SN 108 are not aware of the change in the MR-DC capability. In an example the SN 108 sends SCG reconfiguration messages to the UE 100. However the UE 100 is unable to recognize the SCG reconfiguration messages sent by the SN 108 as the UE 100 is MR-DC disabled. Thus as discussed above, changing the MR-DC capability of the UE 100 after sending the TAU messages to the MME 102, while the UE is in connected mode, results into plurality of disadvantages.

FIG. 11 is a sequence diagram for conventional method indicating the change in the MR-DC capability of the UE 100 when the UE 100 is in the connected mode, and the UE-assistance information is not configured to the network, according to an embodiment as disclosed herein. FIG. 11 explains a scenario where the UE 100 is in the connected mode and is MR-DC enabled. As seen in the FIG. 11 the trigger to disable the MR-DC capability of the UE 100 is received. The TAU messages are sent to the MME 102 indicating the change in the MR-DC capability of the UE 100. The UE capability enquiry is sent by the MME 102 and the UE 100 and the response is received. After receiving the response the MR-DC capability of the UE 100 is disabled. However, the SN 108 releases the SCG reconfiguration upon receiving the response that the MR-DC capability of the UE 100 is disabled. This results into RLF as the UE 100 is already MR-DC disabled.

FIG. 12 is a flow diagram for conventional method indicating the change in the MR-DC capability of the UE 100 when the UE 100 is in the connected mode, according to an embodiment as disclosed herein. The figure states that when the local trigger to change the MR-DC capability is received a local RRC release is done. The UE 100 enters the idle mode by performing the local RRC release. The TAU procedure, an RACH procedure and a security procedure is then sent to the eNB 106 and the MME 102. Thus the eNB 106 and the MME 102 are aware of the MR-DC capability change of the UE 100. The MR-DC capability of the UE 100 is then disabled. (NR modem is disabled at the UE side). The conventional method as explained above has multiple disadvantages and there is no specific method for moving the UE 100 into the idle mode. However the conventional method results in RLF at the network side. Till the time the RLF is detected at the network side, the network continues to send the data to the device which results in loss of data. This also results in wastage of the network resources. The network has to retransmit those packets which are missed by the UE due to the local release. The method as explained in FIG. 13 provides a solution to the problems existing with the conventional methods.

FIG. 13 is a flow diagram 1300 for the proposed method, when the UE 100 is in the connected mode, according to an embodiment as disclosed herein. At step 1302 the trigger for disabling the MR-DC is met. At step 1304 the MR-DC capability connectivity regulator 330 determines whether a dual connectivity (DC) for a secondary node (SN) 108 is configured. The method then proceeds to step 1306 if the DC for the SN 108 is configured and to step 1308 if the DC for the SN 108 is not configured.

In an embodiment if the DC for the SN 108 is not configured then at step 1308 the TAU message is triggered indicating the change in the MR-DC capability of the UE.

In an embodiment if the DC for the SN 108 is configured for the UE then at step 1306 a secondary cell group (SCG) failure indication message is triggered. At step 1310 a timer to receive an acknowledgement of the SCG failure indication message is initiated. At step 1312 the MR-DC capability connectivity regulator 330 determines that the timer is expired and the acknowledgement of the SCG failure indication message is not received or the acknowledgement of the SCG failure indication message is received before expiry of the timer. At step 1314, after receiving the acknowledgement, the monitoring of the downlink of SN 108 is stopped.

At step 1316, TAU message comprising the indication of the change in the MR-DC capability of the UE 100 is triggered to the wireless node.

FIG. 14 is a sequence diagram for method flow 1300, indicating the change in the MR-DC capability of the UE 100 when the UE 100 is in the connected mode, according to an embodiment as disclosed herein. As seen in the FIG. 14 the UE is in the RRC connected state at step 1402. A trigger to disable the MR-DC capability of the UE 100 is received. As can be seen the SN 108 is configured. The trigger to disable the MR-DC capability of the UE 100 is received. The UE 100 sends the SCG failure indication to the eNB 106 at step 1404 and waits for an acknowledgement from the SN 108 by imitating the timer. The eNB 106 after receiving the SCG failure indication, send the acknowledgement to the UE 100 at step 1406. The UE 100 then stops monitoring the downlink for the SCG and the UE 100 is then MR-DC disabled. The TAU messages are sent to the MME 102 indicating the change in the MR-DC capability of the UE 100 at step 1408. As a result of this the data loss from the eNB 106 is elimination. Further there is no redundant usage of the network resources. The RLF problems are also eliminated by the above discussed method. At steps 1410, the eNB 106 sends to the MME 102 a message indicating that no UE radio capability information included. Then, at step 1412, the MME 102 sends to the eNB 106 a UE radio capability match request. The eNB 106 sends to the UE 100 a UE capability enquiry at step 1414, and the UE 100 sends to the eNB 106 UE capability information (MR-DC disable) at step 1416.

FIG. 15 is a flow diagram 1500 for indicating the change in the MR-DC capability of the UE 100 when the UE 100 is in the connected mode, according to an embodiment as disclosed herein. At step 1502 the trigger for disabling the MR-DC is met. At 1504 the MR-DC capability connectivity regulator 330 determines whether a dual capability (DC) for the SN 108 is configured. The method then proceeds to step 1506 if the DC for the SN 108 is configured and to step 1508 if the DC is not configured.

In an embodiment if the DC for the SN 108 is not configured then at step 1508 the TAU message is triggered indicating the change in the MR-DC capability of the UE.

In an embodiment if the DC for the SN 108 is configured for the UE then at step 1506 it is determined whether an MR is configured for the network or not. The method proceeds to step 1510 if the MR is configured and to step 1512 if the MR is not configured. At step 1510 the reporting of the SCG cells and at least one MR is sent, indicating that no SCG cells are available. At step 1514 a timer is initiated to wait for 'x' units of time. At step 1516 it is determined that the timer is expired and the RRC reconfiguration is received is not received or the RRC reconfiguration is received before expiry of the timer. If the RRC reconfiguration is received before expiry of the 'x' units of time then the method proceeds to step 1518 and if the RRC reconfiguration is not received before expiry of the timer then the step proceeds to step 1512.

FIG. 16 is a continuation of flow diagram 1500 of FIG. 15. At 1518, it is determined whether the SCG configuration is present or not. The method proceeds to step 1520 if the SCG configuration is not present and to step 1522 if the SCG configuration is present. At step 1520 the RRC reconfiguration is processed as per the specification and the TAU messages is triggered by the TAU trigger comprising the indication of the change in the MR DC capability of the UE. At step 1522 it is determined whether the SCG failure indication is already triggered. The method proceeds to step 1524 if the SCG failure indication is already triggered and to step 1512 if the SCG failure indication is not triggered. At step 1524 the SCG container is ignored. At step 1526 the RRC reconfiguration is processed as per the specification and the TAU messages is triggered by the TAU trigger comprising the indication of the change in the MR DC capability of the UE.

FIG. 17 is a continuation of flow diagram 1500 of FIGS. 15 and 16. FIG. 17 starts with step 1512. At step 1512 a SCG failure indication trigger is received. The method then proceeds to step 1528. At step 1528 it is determined that the timer is expired, and the acknowledgement of the SCG failure indication message is not received or the acknowledgement of the SCG failure indication message is received before expiry of the timer at step 1530. At step 1532 after receiving the acknowledgement the monitoring of the downlink of SN is stopped. At step 1534, the TAU message comprising the indication of the change in the MR-DC capability of the UE is triggered to the wireless node.

FIG. 18 is a sequence diagram for method flow 1500, indicating the change in the MR-DC capability of the UE 100 when the UE 100 is in the connected mode, according to an embodiment as disclosed herein. As seen in the FIG. 14 the UE is in the RRC connected state. A trigger to disable the MR-DC capability of the UE 100 is received. As can be seen the SN 108 is configured. The trigger to disable the MR-DC capability of the UE 100 is received. The UE 100 sends a Measurement Report (MR) to the eNB indicating that the trigger to disable the MR-DC capability of the UE 100. The UE 100 the sends the SCG failure indication to the eNB 106 and waits for an acknowledgement from the SN 108 by imitating a timer. The eNB 106 after receiving the SCG failure indication, send the acknowledgement to the UE 100. The UE 100 then stops monitoring the downlink for the SCG and the UE 100 is then MR-DC disabled. The TAU messages are sent to the MME indicating the change in the MR-DC capability of the UE 100. The RACH procedure and the security procedure are then followed as discussed above. As a result of this the data loss from the eNB 106 is elimination. Further there is no redundant usage of the network resources. The RLF problems are also eliminated by the above discussed method.

FIG. 19 is a flow diagram 1900 for indicating the change in the MR-DC capability of the UE 100 when the UE 100 is in the connected mode, according to an embodiment as disclosed herein. At step 1902, it is determined whether SN 108 configuration is present or not. The method is stopped if the SN 108 configuration is not present and proceeds to step 1904 if the SN configuration is present. At 1904, the SCG container is ignored in the message and the method is then stopped.

FIG. 20 is a sequence diagram for the flow 1900 shown in FIG. 19. As shown in the FIG. 20, the UE is in RRC connected state with the eNB 106 at step 2000. The trigger to disable the MR-DC of the UE 100 is received at step 2002. The UE 100 sends the TAU messages to the MME 102 at step 2004. The eNB send enquiry for the UE capability and receives a response by the UE 100. The MR-DC capability of the UE 100 is disabled after sending the response at step 2006. The RRC reconfiguration is released and the SCG container is ignored in the message. Thus the above method eliminates RLF on the MN 106. At steps 2008, the eNB 106 sends to the MME 102 a message indicating that no UE radio capability information included. Then, at step 2010, the MME 102 sends to the eNB 106 a UE radio capability match request. The eNB 106 sends to the UE 100 an RRC connection reconfiguration (SN related measurements/reconfigurations) at step 2012, and the UE 100 sends to the eNB 106 an RRC reconfiguration complete (ignore SN container) at step 2014.

FIG. 21 is a flow diagram 2100 for indicating the change in the MR-DC capability of the UE 100 when the UE 100 is in the connected mode, according to an embodiment as disclosed herein. At step 2102, it is determined whether the SN configuration is present or not. The method proceeds to step 2104 if the SCG configuration is not present and to step 2106 if the SCG configuration is present. At step 2104 the UE 100 waits for the capability update procedure to be completed. At step 2106 it is determined whether the SCG failure indication is already triggered. The method proceeds to step 2108 if the SCG failure indication is already triggered and to step 2110 if the SCG failure indication is not triggered. At step 2108 the SCG container is ignored. At step 2110 a secondary cell group (SCG) failure indication message is triggered. At step 2112 a timer to receive an acknowledgement of the SCG failure indication message is initiated. At step 2114 it is determined that the timer is expired and the acknowledgement of the SCG failure indication message is not received or the acknowledgement of the SCG failure indication message is received before expiry of the timer. At step 2116 after receiving the acknowledgement the monitoring of the downlink of SN is stopped. At step 2118 a TAU message comprising the indication of the change in the MR-DC capability of the UE 100 is triggered to the wireless node.

FIG. 22 is a sequence diagram for the flow 2100 shown in FIG. 21. As shown in the FIG. 22, the UE 100 is in RRC connected state with the eNB 106. The trigger to disable the MR-DC of the UE 100 is received. The UE 100 sends the TAU messages to the MIME. The eNB send enquiry for the UE capability and receives a response from the UE 100. The MR-DC capability of the UE 100 is disabled after sending the response. The RRC reconfiguration is released. The SCG failure indication message is triggered and the acknowledgement is received by the UE 100. The UE 100 stops monitoring the downlink for the SCG. The SN 108 container is ignored. Thus the above said method eliminates the problem RLF on the MN.

The embodiments disclosed herein can be implemented through at least one software program running on at least one hardware device and performing network management functions to control the elements. The elements shown in FIGS. 3 through 22 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for indicating a change in multi-radio access technology (RAT) dual connectivity (MR-DC) capability by a user equipment (UE), the method comprising:

detecting, by the UE, a change in the MR-DC capability of the UE;

identifying, by the UE, an operation mode of the UE, the operation mode being one of an idle mode and a connected mode;

in response to the operation mode being the idle mode:
detecting, by the UE, an event,
identifying a validity of the change in the MR-DC capability of the UE after detecting the event, and
providing, to a first network node, information indicating that the MR-DC capability of the UE is changed based on a result of the identification; and in response to the operation mode being the connected mode:
identifying, by the UE, whether UE-assistance information is configured by the first network node, and
providing, to the first network node, the information indicating the change in the MR-DC capability of the UE based on the UE-assistance information in response to identifying that the UE-assistance information is configured by the first network,
wherein the event comprises an event related to at least one of a mobile originated request, a mobile terminated request, a data request, a signaling request, and a short message service (SMS) request.

2. The method of claim 1, wherein the operation mode of the UE is changed into the connected mode from the idle mode based on the event.

3. The method of claim 1, further comprising:
in response to the operation mode being the idle mode, holding, by the UE, transmission of a tracking area update (TAU) procedure message.

4. The method of claim 3, further comprising:
identifying that a trigger has occurred; and
transmitting, to the first network node, the TAU message indicating the change in the MR-DC capability of the UE based on the trigger.

5. The method of claim 1, wherein providing, to the first network node, the information indicating the change in the MR-DC capability of the UE based on the UE-assistance information comprises:
determining, by the UE, disable of the MR-DC capability of the UE based on the UE-assistance information;
transmitting, by the UE, to the first network node, a secondary cell group (SCG) failure indication message indicating that there is no measurements of a secondary network node;
disabling, by the UE, the MR-DC capability of the UE, in response to receiving a response signal for the SCG failure indication message from the first network node; and
transmitting, by the UE, to the first network node, information indicating the disable of the MR-DC capability of the UE.

6. The method of claim 5, wherein the disabling of the MR-DC capability of the UE comprises:
determining, by the UE, whether the response signal is received within a predetermined time; and
disabling, by the UE, the MR-DC capability of the UE, in response to receiving the response signal within the predetermined time.

7. The method of claim 1, further comprising:
in response to the operation mode being the connected mode, transmitting, by the UE, to the first network node, a request message for the change in the MR-DC capability of the UE;

receiving, by the UE, from the first network node, a response message indicating that a connection for a second network node is release; and indicating providing, by the UE, to the first network node, information indicating the change in the MR-DC capability of the UE based on the response message.

8. The method of claim 1, further comprising:

in response to the operation mode being the connected mode, determining, by the UE, whether a dual connectivity (DC) for a second network node is configured;

in response to determining that the DC for the second network node is configured, determining, by the UE, to transmit measurements for the second network node to the first network node; and indicating providing, by the UE, to the first network node, information indicating the change in the MR-DC capability of the UE based on determination to transmit the measurements.

9. A user equipment (UE), comprising:

a transceiver; and at least one processor coupled with the transceiver and configured to:

detect a change in multi-radio access technology (RAT) dual connectivity (MR-DC) capability of the UE, identify an operation mode of the UE, the operation mode being one of an idle mode and a connected mode, in response to the operation mode being the idle mode: detect an event, check a validity of the change in the MR-DC capability of the UE after detecting the event, and provide, to a first network node, information to indicate the MR-DC capability of the UE is changed based on a result of the check, and in response to the operation mode being connected mode: identify whether UE-assistance information is configured by the first network node, and provide, to a first network node, information indicating the change in the MR-DC capability of the UE based on the UE-assistance information in response to identifying that the UE-assistance information is configured by the first network node, wherein the event comprises an event related to at least one of a mobile originated request, a mobile terminated request, a data request, a signaling request, and a short message service (SMS) request.

10. The UE of claim 9, wherein the operation mode of the UE is changed into the connected mode from the idle mode based on the event.

11. The UE of claim 9, wherein the at least one processor is further configured to:

in response to the operation mode being the idle mode, hold transmission of a tracking area update (TAU) message.

12. The UE of claim 11, wherein the at least one processor is further configured to:

identify that a trigger has occurred; and control the transceiver to transmit, to the first network node, the TAU message indicating the change in the MR-DC capability of the UE based on the trigger.

13. The UE of claim 12, wherein the trigger includes a trigger for establishing connection with a second network node based on one of a mobile originated request and a mobile terminated request.

14. The method of claim 3, wherein the trigger includes a trigger for establishing connection with a second network node based on one of a mobile originated request and a mobile terminated request.

15. The UE of claim 9, wherein the at least one processor is further configured to:

determine disable of the MR-DC capability of the UE based on the UE-assistance information;

control the transceiver to transmit, to the first network node, a secondary cell group (SCG) failure indication message indicating that there is no measurements of a secondary network node;

disable the MR-DC capability of the UE, in response to receiving a response signal for the SCG failure indication message from the first network node; and control the transceiver to transmit, to the first network node, information indicating the disable of the MR-DC capability of the UE.

16. The UE of claim 15, wherein the at least one processor is further configured to:

determine whether the response signal is received within a predetermined time; and disable the MR-DC capability of the UE, in response to receiving the response signal within the predetermined time.

17. The UE of claim 9, wherein the at least one processor is further configured to:

in response to the operation mode being the connected mode, control the transceiver to transmit, to the first network node, a request message for the change in the MR-DC capability of the UE;

control the transceiver to receive, from the first network node, a response message indicating that a connection for a second network node is release; and provide, to the first network node, information indicating the change in the MR-DC capability of the UE based on the response message.

18. The UE of claim 9, wherein the at least one processor is further configured to:

in response to the operation mode being the connected mode, determine whether a dual connectivity (DC) for a second network node is configured;

in response to determining that the DC for the second network node is configured, determine to transmit measurements for the second network node to the first network node; and provide, to the first network node, information indicating the change in the MR-DC capability of the UE based on determination to transmit the measurements.

* * * * *